(12) United States Patent
Ishimoto

(10) Patent No.: US 8,312,122 B2
(45) Date of Patent: Nov. 13, 2012

(54) DEVICE MANAGEMENT SYSTEM, DEVICE, AND COMPUTER READABLE MEDIUM

(75) Inventor: Kan Ishimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 93 days.

(21) Appl. No.: 12/400,520

(22) Filed: Mar. 9, 2009

(65) Prior Publication Data

US 2009/0248849 A1 Oct. 1, 2009

(30) Foreign Application Priority Data

Mar. 28, 2008 (JP) ................................. 2008-088811

(51) Int. Cl.
G06F 15/167 (2006.01)
G06F 15/16 (2006.01)
G06F 15/173 (2006.01)
H04L 9/32 (2006.01)
H04N 1/40 (2006.01)

(52) U.S. Cl. ........ 709/223; 709/216; 709/217; 709/224; 709/250; 713/176; 358/3.28

(58) Field of Classification Search .................. 709/216, 709/217, 223, 224, 250; 713/176; 358/3.28; 715/700
See application file for complete search history.

(56) References Cited

U.S. PATENT DOCUMENTS

| | | | |
|---|---|---|---|
| 7,099,490 B1 | 8/2006 | Fujita et al. | |
| 7,343,559 B1 * | 3/2008 | Fujita et al. | 715/733 |
| 2005/0096992 A1 * | 5/2005 | Geisel et al. | 705/24 |
| 2007/0162300 A1 * | 7/2007 | Roever et al. | 705/1 |
| 2007/0226618 A1 * | 9/2007 | Oya | 715/700 |
| 2009/0070588 A1 * | 3/2009 | Staring | 713/176 |

FOREIGN PATENT DOCUMENTS

| | | |
|---|---|---|
| JP | 2000-183877 A | 6/2000 |
| JP | 2001-109692 A | 4/2001 |
| JP | 2002-082973 A | 3/2002 |
| JP | 2005-341041 A | 12/2005 |
| JP | 2007-034445 A | 2/2007 |
| JP | 2007-257266 A | 10/2007 |
| JP | 2007-257525 A | 10/2007 |
| WO | 0109726 A1 | 2/2001 |

OTHER PUBLICATIONS

Japan Patent Office; Notification of Reason for Refusal in Japanese Patent Application No. 2008-088811 mailed May 11, 2010.

* cited by examiner

*Primary Examiner* — Ranodhi Serrao
*Assistant Examiner* — Farrukh Hussain
(74) *Attorney, Agent, or Firm* — Baker Botts L.L.P.

(57) ABSTRACT

A device management system, a device, and a management apparatus are provided. The device management system includes a plurality of devices that are coupled to a network; and a management apparatus that is coupled to the network. The devices include a first device and a second device. The first device stores icon image data indicating the device and including specified information embedded therein as digital watermark information. The second device stores icon image data indicating the device but not including specified information. The management apparatus includes a response information receiving unit; a response detecting unit that detects whether the specified information is embedded as the digital watermark information in the icon image data; and a device specifying unit that specifies a device as a first device or a second device.

5 Claims, 16 Drawing Sheets

| | MODEL NAME | IP ADDRESS | ICON IMAGE DATA |
|---|---|---|---|
| LA0 | MODEL NAME | IP ADDRESS | ICON IMAGE DATA |
| LA1 | PRINTER A | 10.10.1.1 | ****(BINARY DATA) |
| LA2 | MFP 1 | 10.10.1.4 | ****(BINARY DATA) |
| LA3 | MFP 2 | 10.10.1.50 | ****(BINARY DATA) |
| LA4 | PRINTER B | 10.10.1.51 | (NONE) |
| | | | |

| MODEL NAME | IP ADDRESS | ICON IMAGE DATA |
|---|---|---|
| PRINTER A | 10.10.1.1 | ****(BINARY DATA) |
| MFP 1 | 10.10.1.4 | ****(BINARY DATA) |
| | | |

FIG. 15

| | FIRST MANAGEMENT INFORMATION | SECOND MANAGEMENT INFORMATION | FIRST MANAGEMENT INFORMATION | | |
|---|---|---|---|---|---|
| | NODE NAME | NUMBER OF SHEETS PRINTED | INSTALLATION LOCATION | SERIAL NO. | STATUS |
| LB0 | | | | | |
| LB1 | BRN 0001 | 12556 | 5F OFFICE | AAN000120 | READY |
| LB2 | BRN 0002 | 15 | 4F DESIGN ROOM | AAN001521 | SLEEP |
| LB3 | BRN 00A0 | 1064 | 1F RECEPTION ROOM | MPN010520 | TONER LOW |
| LB4 | BRN 00AC | (ERROR) | 1F OFFICE | MSC013925 | READY |

FIG. 16

| MODEL NAME | IP ADDRESS | NODE NAME | STATUS |
|---|---|---|---|
| PRINTER A | 10.10.1.1 | BRN 0001 | READY |
| MFP 1 | 10.10.1.4 | BRN 0002 | SLEEP |
| MFP 2 | 10.10.1.50 | BRN 00A0 | TONER LOW |

LC1, LC2, LC3 — 90

DEVICE MANAGEMENT SYSTEM, DEVICE, AND COMPUTER READABLE MEDIUM

CROSS-REFERENCE TO RELATED APPLICATIONS

This application claims priority from Japanese Patent Application No. 2008-088811 filed on Mar. 28, 2008, the entire contents of which are incorporated herein by reference.

TECHNICAL FIELD

Systems, devices, and a computer readable medium storing programs consistent with the present invention relate to managing a plurality of devices, coupled to a network, by a computer coupled to the network.

BACKGROUND

Printers, scanners, multi functional peripherals (MFP), and other devices having network interfaces are being used widely in recent years. Such devices are used upon being coupled to a network along with computers and other devices and various management programs for managing these devices have been proposed.

For example, JP-A-2007-34445 describes using management information, referred to as a management information base (MIB) in a simple network management protocol (SNMP), which is one of the protocols for managing a device coupled to a network. The management information is used to identify a manufacturer of the device and is capable of managing the device of a specific type, for example, of a specific manufacturer.

A device that is to be subject to management may be produced by an original equipment manufacturer (OEM). As a manufacturer name and model of such a device made by an OEM, a company name and model of a company that sells the device (i.e., a distributor) are attached to the device rather than a company name and model number of a company that actually manufactures the device (i.e., the OEM maker). As a protocol for a device search in a network, a link layer topology discovery (LLTD) protocol has been proposed. According to the LLTD, data of an icon image (i.e., icon image data), used for displaying a network map, may be included in a response by a device.

In an inquiry using the MIB, it is possible to inquire about a plurality of information items with a single inquiry (i.e., an inquiry by a single packet). However, when a single packet is used, if the plurality of information items include even one information item that is not supported by a device, there is a disadvantage in that acquisition of all the information items, including the other information items (i.e., the supported information items), cannot be performed.

Among MIBs, there is a so-called private MIB, which is defined uniquely by a manufacturer. With this MIB, a manufacturer's unique information can be acquired. In device management using the private MIB, a device made by a different manufacturer from the manufacturer that defined the private MIB (i.e., a device made by an OEM is not included among devices made by the different manufacturer) does not support the private MIB and consequently cannot make a response. Thus, in a case where a single packet is used to inquire about a plurality of information items, including an information item acquirable by a private MIB, if a managed device does not support one private MIB, there is a disadvantage in that a managing device is caused to fail to acquire all information items, including the other information items that are in accordance with the supported MIBs, from the managed device. As a countermeasure for such a circumstance, it is possible to use a method of acquisition by execution of an inquiry for each information item using the MIB corresponding to the information item. With this method, failure to acquire information items that are in accordance with supported MIBs can be prevented.

However, if such a method is performed on all managed devices, the number of inquires increases. That is, as the number of managed devices on a network increases, the number of inquires also increases. Accordingly, even in the case in which a single packet may be used to manage a certain manufacturer's own device (i.e., including a device made by an OEM) that includes a plurality of information items, and the information items include an information item corresponding to a private MIB, there is a disadvantage in that an the number of inquires that must be executed by the MIB is proportional to the number of information items to be acquired.

SUMMARY

Illustrative aspects of the present invention provide, in a case where a plurality of managed devices are to be managed, a device management system capable of classifying the managed devices into specific groups, a device capable of being a part of the device management system, and a device management program enabling a computer to realize functions as a management apparatus.

According to an illustrative aspect of the present invention, there is provided a device management system comprising: a plurality of devices that are coupled to a network, the plurality of devices including a first device and a second device; and a management apparatus that is coupled to the network, wherein the first device comprises: a first storage unit that stores icon image data, the icon image data indicating the first device and including specified information related to the first device embedded therein as digital watermark information; a first request receiving unit that receives a request from the management apparatus; and a first responding unit that transmits, if the first request receiving unit receives the request, first response information to the management apparatus, the first response information including the icon image data stored in the first storage unit, wherein the second device comprises: a second storage unit that stores icon image data, the icon image data indicating the second device but not including specified information related to the second device embedded therein as digital watermark information; a second request receiving unit that receives a request from the management apparatus; and a second responding unit that transmits, if the second request receiving unit receives the request, second response information to the management apparatus, the second response information including the icon image data stored in the second storage unit, and wherein the management apparatus comprises: a response information receiving unit that receives the first response information and the second response information; a response detecting unit that detects whether the specified information is embedded as the digital watermark information in the icon image data included in the first response information and the second response information; and a device specifying unit that specifies a device that is a transmission source of the first response information including the specified information, as a first device, and a device that is a transmission source of the second response information not including the specified information, as the second device.

According to another illustrative aspect of the present invention, there is provided a device comprising: a storage unit that stores icon image data indicating the device and including specified information related to the device embedded therein as digital watermark information; a request receiving unit that receives a request; and a responding unit that transmits, if the request receiving unit receives the request, response information including the icon image data.

According to yet another illustrative aspect of the present invention, there is provided a computer readable medium storing a device management program, readable by a specific computer included in a management apparatus managing a first device and a second device by receiving first response information and second response information respectively from the first device and the second device, the device management program configuring the specific computer to function as: a response detecting unit that detects whether specified information is embedded as a digital watermark information in icon image data included in the first response information and the second response information received, and a device specifying unit that specifies a device that is a transmission source of the first response information including the specified information, as the first device; and a device that is a transmission source of the second response information not including the specified information, as the second device.

BRIEF DESCRIPTION OF THE DRAWINGS

FIG. 15 is a diagram for describing an example of contents of a management information request signal in the routine of FIG. 14 and an example of management information returned from the devices;

FIG. 16 is a diagram for describing an example of a display displayed on a display device of the specific computer in the exemplary embodiment of FIG. 11.

DESCRIPTION

Exemplary embodiments of the present invention shall now be described in detail with reference to the drawings.

Exemplary Embodiment 1

Figure 1:
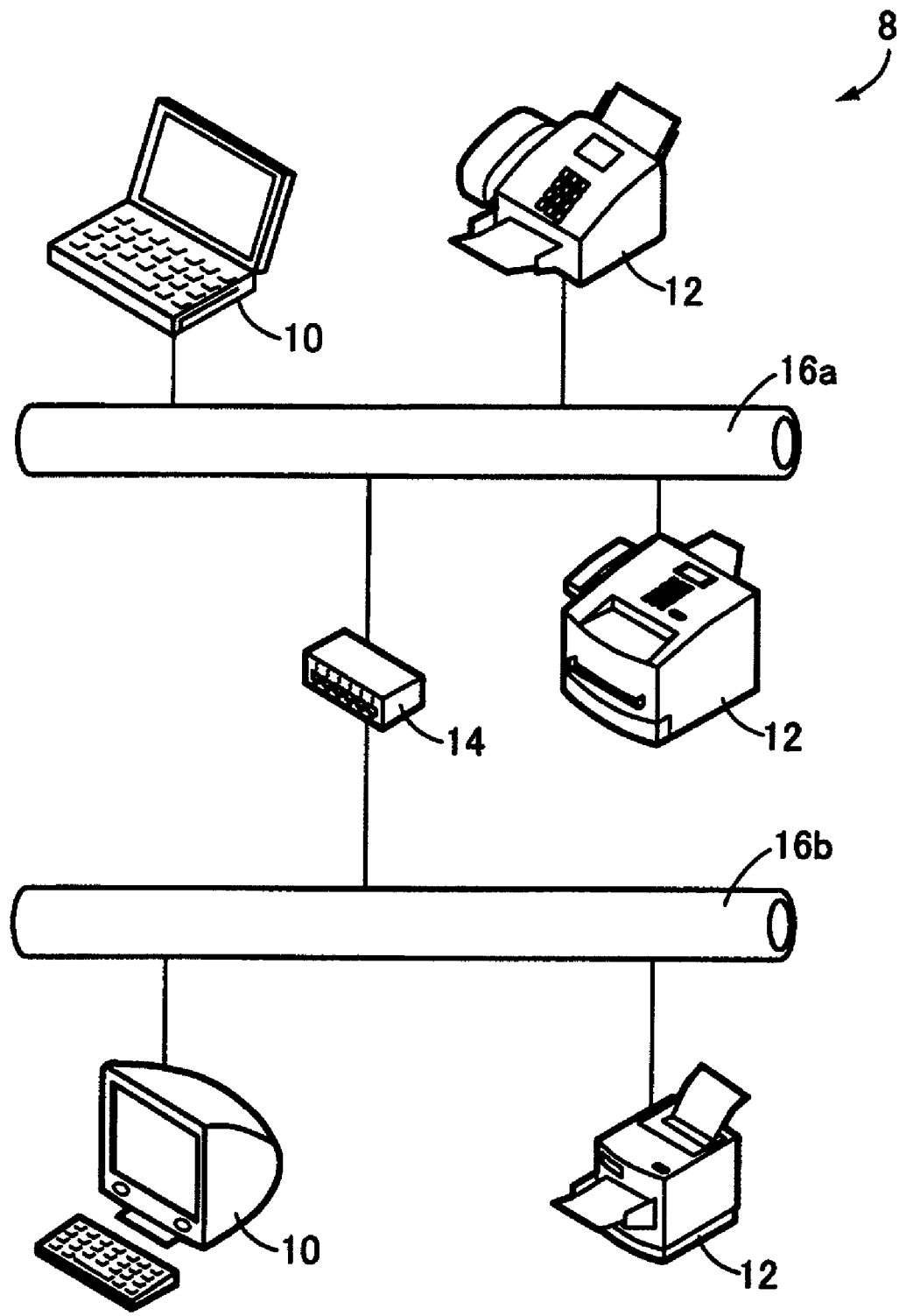
FIG. 1 is a diagram for describing an example of a network, to which a device management system according to an exemplary embodiment the present invention is applied and which includes devices according to an exemplary embodiment of the present invention and specific computers that are configured by and execute a device management program according to an exemplary embodiment of the present invention applied thereto.

FIG. 1 is a diagram for describing an example of networks to which are applied a device management system 8, devices 12, and specific computers 10, operating as management apparatuses by operation of a device management program, according to an exemplary embodiment of the present invention. As used herein a "specific computer" denotes a computer that has been specifically modified and adapted by a device management program according to an exemplary embodiment of the present invention. In FIG. 1, in each of the network 16a and the network 16b, a plurality of specific computers 10 and devices 12 are coupled in a manner enabling exchange of information. The plurality of networks 16a and 16b are coupled together by a router, hub, or other network equipment 14. In FIG. 1, the networks 16a and 16b are for describing that the specific computers 10, the devices 12, etc., are coupled by the networks 16a and 16b and do not illustrate connection forms accurately. Also, although two specific computers 10 are shown in FIG. 1, the number of specific computers 10 is not restricted.

Of the above, each device 12 (shall be referred to simply as "device 12" in a case where a distinction is not made between a first device 12a and a second device 12b to be described below) is, for example, equipment that is coupled to the network and is enabled to perform information communication with other devices, specific computers, etc., on the network. Examples of the device 12 are a printer, a scanner, a multi functional peripheral (MFP), etc.

Figure 2:
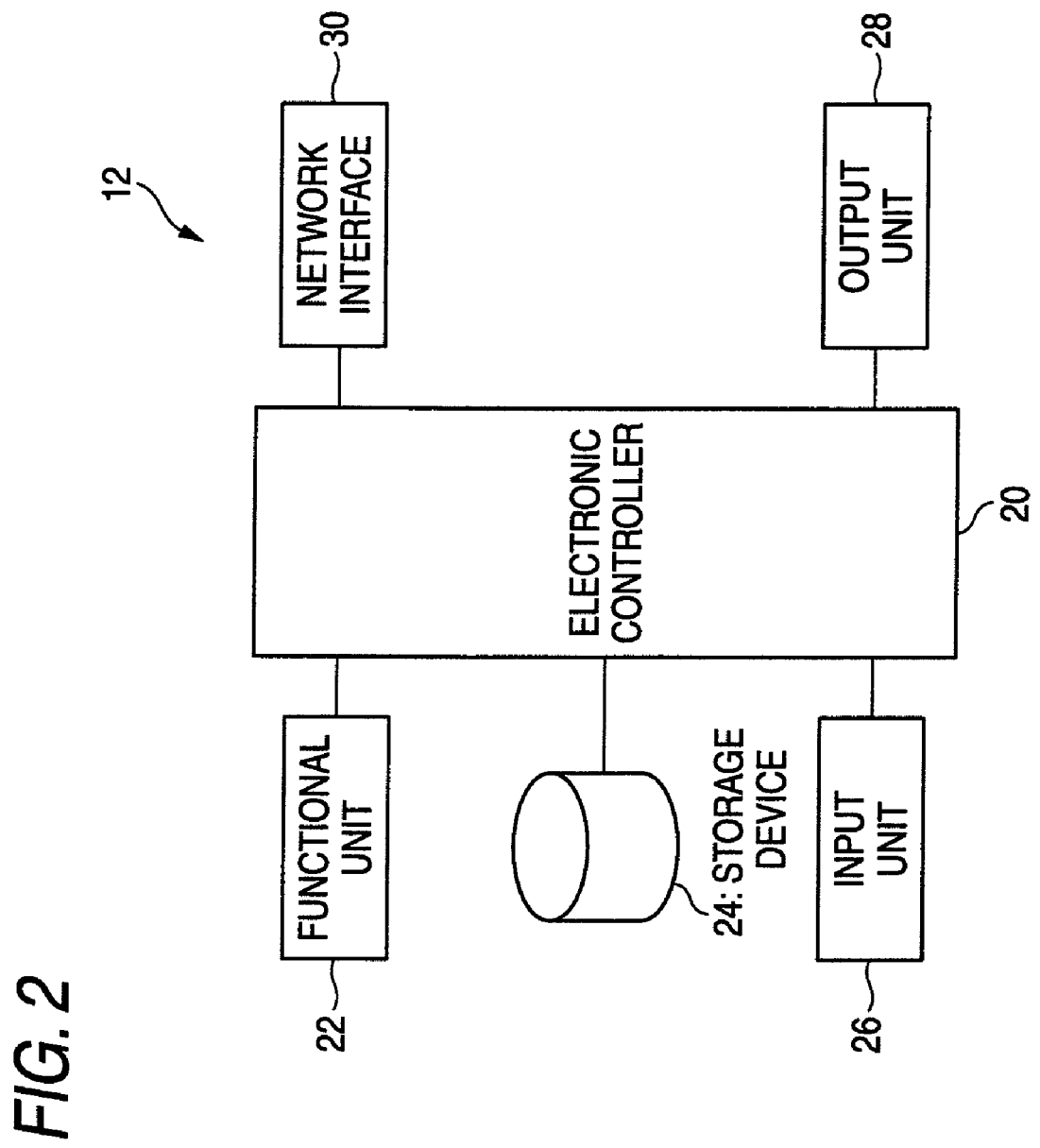
FIG. 2 is a diagram for describing a configuration of a device according to an exemplary embodiment of the present invention.

FIG. 2 is a diagram for describing in outline a configuration of units that make up the device 12. Of these, an electronic controller 20 includes a so-called microcomputer, in turn including a central processing unit (CPU), a random access memory (RAM), a read only memory (ROM), an input/output interface, etc., and the CPU is configured to perform signal processing in accordance with a program stored in the ROM in advance while using a temporary storage function of the RAM to execute such processes as control operations in a functional unit 22 to be described below. The CPU is also configured to perform transmission and reception of information with respect to other equipment via a network interface 30, etc.

The functional unit 22 executes functions that the device 12 has inherently, and for example, executes a printing function of printing instructed information in a case where the device 12 is a printer, or an image reading function for converting a read image into electronic information in a case where the device 12 is a scanner.

A storage device 24 preserves information, such as a result of computation by the electronic controller 20, in a readable manner according to an instruction from the electronic controller 20, and is realized, for example, by a RAM or a hard disk device, etc.

An input unit 26 is, for example, a pushbutton-type input device, etc., and enables input of setting information related to an operation of the device 12, etc. An output unit 28 is, for example, a liquid crystal panel or other display device and displays an operation state of the device 12, contents of input by the input unit 26, etc.

The network interface 30 couples the device 12 to a network and enables transmission and reception of information with respect to other devices 12 and specific computers 10 coupled to the network. For example, a command related to a control operation of the device 12, setting information related to an operation, etc., are received via the network, and information to be subject to processing at the functional unit 22, information generated in the functional unit 22, etc., are transmitted and received.

Figure 3:
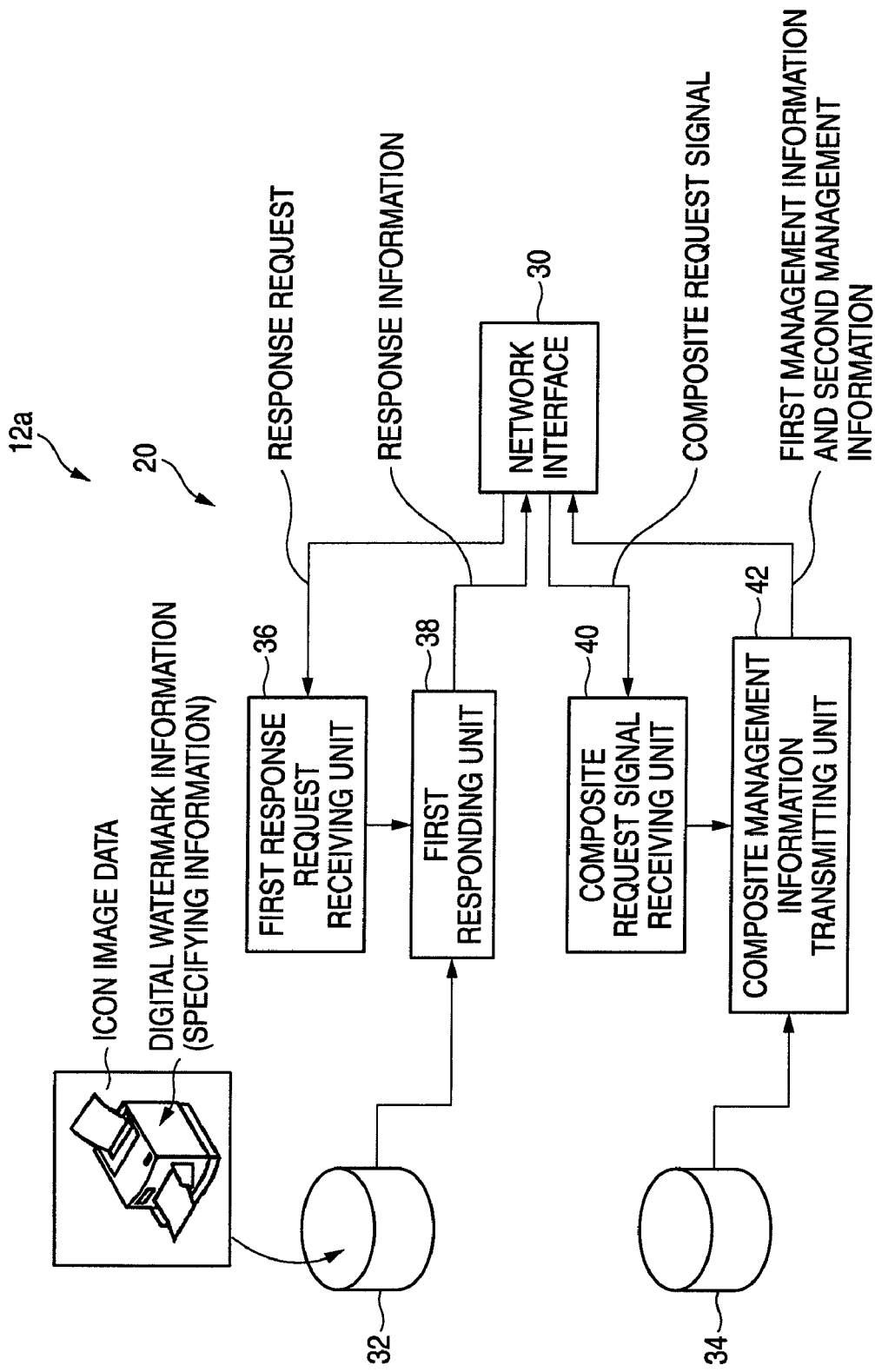
FIG. 3 is a functional block diagram for describing in outline an example of control functions of an electronic controller of the device of FIG. 2 in a case in which the device operates as a first device.

FIG. 3 is a functional block diagram for describing an example of control functions of the electronic controller 20 of a device 12 that functions as a first device 12a. The first device 12a includes a first storage unit 32 that is disposed, for example, in the storage device 24 and stores information for identifying the first device 12a. The information for identifying the first device 12a is information related, for example, to a manufacturer name, a model name of the device, a network address, such as an IP address or MAC address, that is set, etc., and is stored, for example, as text (character) data.

In addition to the information for identifying the first device 12a, icon image data, in which specified information for specifying the first device 12a is embedded as digital watermark information, are stored in the first storage unit 32. The specified information includes, for example, at least one information item among the manufacturer name of the device or a title abbreviating the manufacturer name or other character string based on the manufacturer name, an information item related to a function supported by the device, that is, a function that the functional unit 22 has, and an information item related to a type of the device, that is, an information item related to whether the device is a printer or a scanner or a multi functional peripheral, etc.

The icon image data stored in the first storage unit 32 are that of an image that is in accordance with a function that the device has. For example, in a case where the device is a printer, an image of a printer is used. The icon image data are stored in the first storage unit 32 as image data of a format, such as a bitmap format, Joint Photographic Experts Group (JPEG) format, etc.

The specified information is embedded as digital watermark information in the icon image data stored in the first storage unit 32. The digital watermark information refers to the specified information embedded in the icon image by an art enabling information to be embedded in icon image data by performing a process in accordance with the specified information to be embedded in the icon image data and enabling the specified information, embedded in the icon image data, to be taken out by a restoration process. Here, a process of embedding the information is performed so that when the icon image data are, for example, displayed as an image on a display device of a computer, a significant change in outer appearance of the image cannot be felt before and after the information embedding process. Specifically for example, a method of embedding into pixels of the icon image data or a method of embedding into frequency components is employed. Of these, in regard to embedding into pixels, an icon image is made up of a collection of plurality of pixels and each pixel has information related to luminance and color tone, and by minutely changing the information related to luminance according to the specified information to be embedded in the icon image data, the specified information is embedded in the icon image data. In embedding into frequency components, the specified information is embedded into the icon image data by converting the icon image data into frequency components by a Fourier transform, etc., embedding information in accordance with the specified information in frequency components, which, among the frequency components of the icon image data, do not influence an image quality of the icon image, that is, changing the frequency components that do not influence the image quality according to the specified information, and thereafter performing an inverse transform to regenerate the icon image data.

In a case where a device is supplied by OEM production, in order to avoid confusion, storage of a name of a manufacturer that is a distribution source is generally employed in regard to the manufacturer name serving as the information for identifying the device. In this case, the manufacturer name of the OEM manufacturer that actually manufactured the device is stored as the manufacturer name that is the specified information included as the digital watermark information in the icon image data. In this case, because the OEM manufacturer name is embedded as the digital watermark information in the icon image data and the OEM manufacturer will not be seen unless a restoration process, which is generally not used often, is performed, no confusion is caused, and yet the device management system 8 according to an exemplary embodiment of the present invention can know the name of the OEM manufacturer that actually manufactured the device by performing the predetermined restoration process on the icon image data.

A first response request receiving unit 36 receives, via the network interface 30, a response request transmitted to the first device 12a via the network from a response request transmitting unit 66 to be described later. When the first response request receiving unit 36 receives the response request, a first responding unit 38 returns the information for identifying the device and the icon image data expressing the device, stored in the first storage unit 32, as first response information via the network interface 30. The first response information returned by the first responding unit 38 is, for example, made up of information of types requested in the response request. A management information storage unit 34, a composite request signal receiving unit 40, and a composite management information transmitting unit 42, which are other portions shown in FIG. 3, are used in another exemplary embodiment to be described below and description thereof shall be provided later.

Figure 4:
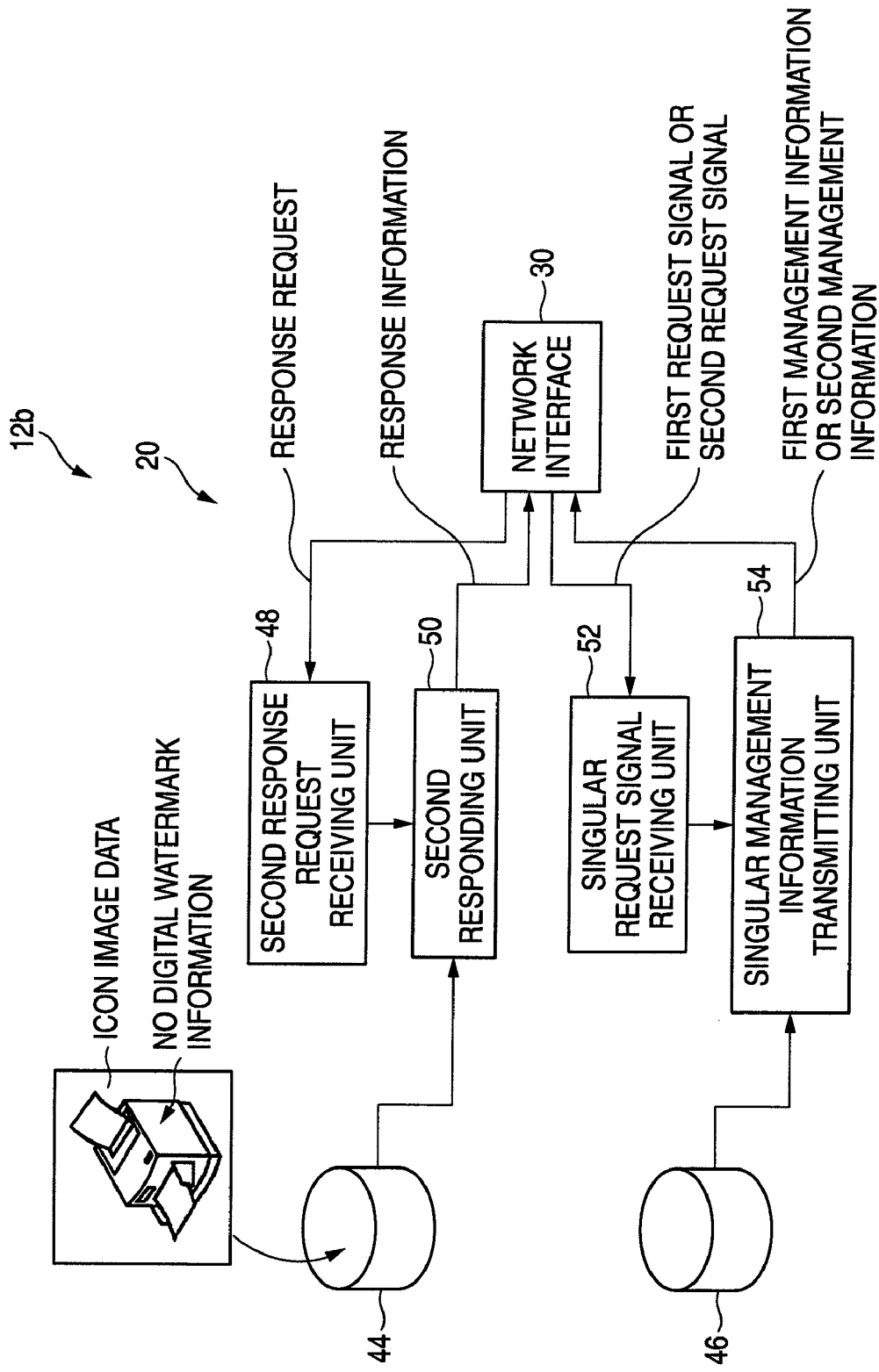
FIG. 4 is a functional block diagram for describing in outline an example of control functions of the electronic controller of the device of FIG. 2 in a case in which the device operates as a second device.

FIG. 4 is a functional block diagram for describing an example of control functions of the electronic controller 20 of a device 12 that functions as a second device 12b. Of these portions, a second storage unit 44 stores, in addition to information for identifying the second device 12a, icon image data expressing the second device 12b. Here, as with the information for identifying the first device 12a stored in the first storage unit 32 of the first device 12a described above, the information for identifying the second device 12b is information related to, for example, a manufacturer name, a model name of the device, a network address, such as an IP address or MAC address, that is set, etc., and is stored, for example, as text (character) data.

Unlike the icon image data stored in the first storage unit 32 of the first device 12a, the icon image data stored in the second storage unit 44 does not have digital watermark information embedded in the icon image data. In the following, in a case where a distinction is not made between the first storage unit 32 and the second storage unit 44, both shall be referred to simply as the "storage unit."

As with the first response request receiving unit 36, a second response request receiving unit 48 receives, via the network interface 30, a response request transmitted to the second device 12b via the network from the response request transmitting unit 66 to be described later. When the second response request receiving unit 48 receives the response request, a second responding unit 50, like the first responding unit 38, returns the information for identifying the device and the icon image data expressing the device, stored in the second storage unit 44, as second response information via the network interface 30. The second response information returned by the second responding unit 50 is, for example, made up of information of types requested in the response request. In the following, in a case where a distinction is not made between the first response information and the second response information returned from a device 12 in response to the response request, both shall be referred to simply as the "response information," in a case where a distinction is not made between the first responding unit 38 and the second responding unit 50, both shall be referred to simply as the "responding unit," and in a case where a distinction is not made between the first response request receiving unit 36 and the second response request receiving unit 48, both shall be referred to simply as the "response request receiving unit." A management information storage unit 46, a singular request signal receiving unit 52, and a singular management information transmitting unit 54, which are other portions shown in FIG. 4, are used in another exemplary embodiment to be described below and description thereof shall be provided later.

Figure 5:
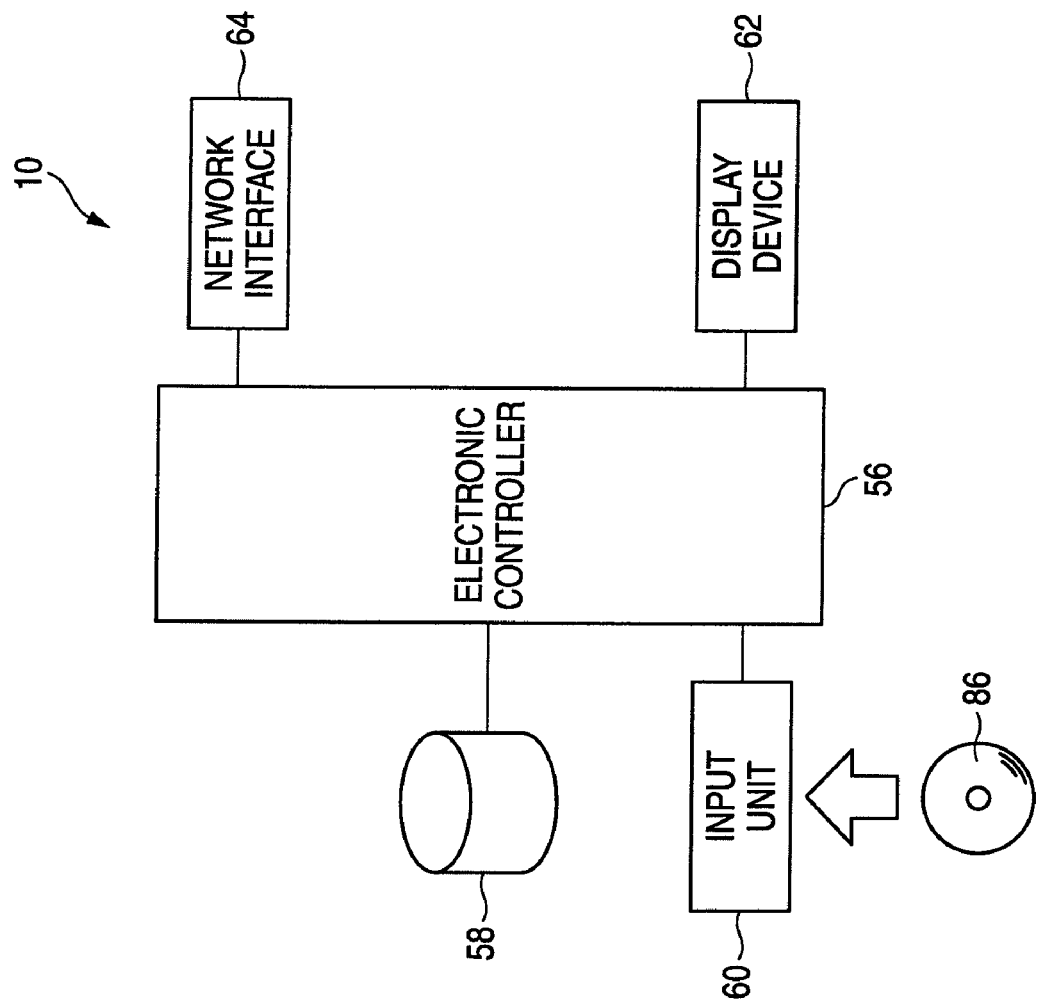
FIG. 5 is a diagram for describing an example of a specific computer which is configured by and executes the device management program according to an exemplary embodiment of the present invention.

FIG. 5 is a diagram for describing in outline an example of a configuration of the specific computer 10 of FIG. 1. An electronic controller 56 includes a so-called microcomputer, in turn including a CPU, a RAM, a ROM, an input/output interface, etc., and the CPU performs signal processing in accordance with a program stored in the ROM in advance while using a temporary storage function of the RAM to realize functions for making up the device management system.

A storage device 58 preserves information, such as a result of computation by the electronic controller 56, in a readable manner in accordance with an instruction from the electronic controller 56, and is realized, for example, by a RAM or a hard disk device, etc.

An input unit 60 includes an input device, such as a keyboard or a mouse, etc., that accepts inputs from a user, and an information input device, such as a CD-ROM drive, etc., that accepts input of information by reading information stored in a storage medium 86, such as a CD-ROM, etc. That is, the device management program that is readable by a specific computer is stored in the storage medium 86 and is executed by the electronic controller 56 upon reading of the storage medium 86 by the input unit 60. A display device 62 includes a display unit, etc., is an electronic controller, etc., and enables the user to perform input of setting information related to operations of the devices 12. The display device 62 is, for example, a liquid crystal panel, etc., that optically displays settings for execution of the device management program, execution results, etc. The display device 62 may be built into the specific computer 10 or may be disposed separately from the specific computer 10 and operate as the display device 62 of the specific computer 10 by being connected to the specific computer 10.

A network interface 64 couples the specific computer 10 to the network and enables transmission and reception of information with respect to the devices 12 and other specific computers 10 connected to the network. For example, transmission of the response request to the devices 12, receiving of the response information from the devices 12, etc., are performed via the network interface 64.

Figure 6:
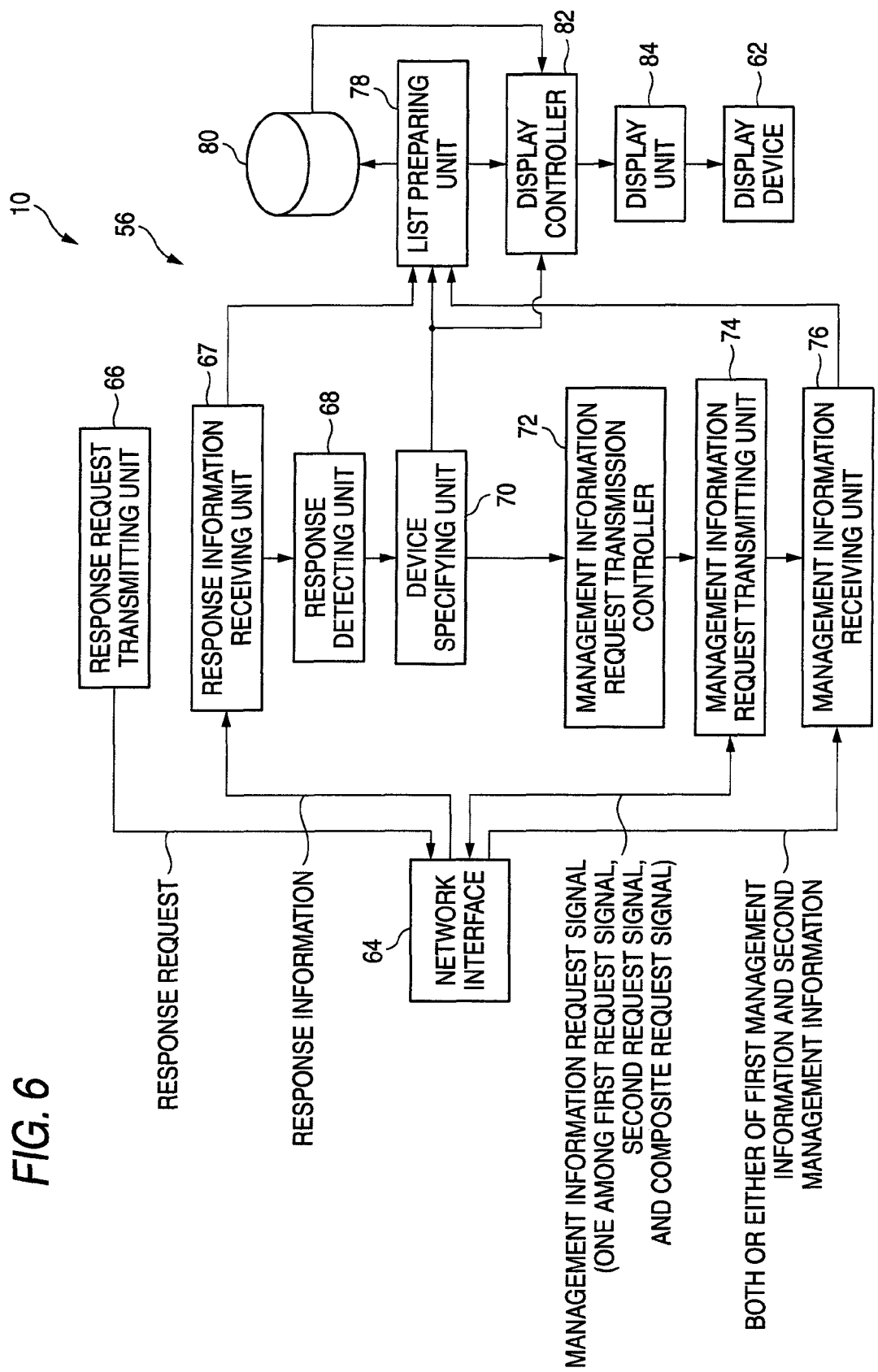
FIG. 6 is a diagram for describing in outline an example of control functions of an electronic controller of the specific computer of FIG. 5.

FIG. 6 is a functional block diagram for describing an example of control functions of the electronic controller 56 of the specific computer 10. The response request transmitting unit 66 transmits, via the network interface 64, the response request that requests the devices 12 to transmit the response information. The response request, for example, requests that information stored in common in the first storage units 32 of the first devices and in the second storage units 44 of the second devices be transmitted as the response information. The response information can thereby be returned in response to the response request regardless of whether a device is a first device or a second device. A response information receiving unit 67 receives, via the network interface 64, the response information returned from the devices 12 that have received the response request. Here, in the communication between the response request transmitting unit 66 of the specific computer 10 and the response request receiving units 36 and 48 of the devices 12 and the communication between the response information receiving unit 67 of the specific computer 10 and the responding units 38 and 50 of the devices 12, a communication procedure (protocol), specifically, for example, LLTD, with which it is defined that the icon image data that the devices 12 have are included in the response information returned from the devices 12, is used. The protocol used in the communication between the response request transmitting unit 66 of the specific computer 10 and the response request receiving units 36 and 48 of the devices 12 and the communication between the response information receiving unit 67 of the specific computer 10 and the responding units 38 and 50 of the devices 12 corresponds to the first protocol.

The response detecting unit 68 performs, on the icon image data indicating each device 12 in the response information received by the response information receiving unit 67, a digital watermark information restoration process to detect whether or not the specified information is embedded as the digital watermark information in the icon image data. If the response detecting unit 68 detects that the specified information is embedded as the digital watermark information in the icon image data, a device specifying unit 70 specifies the device 12 that transmitted the icon image data to be a first device 12a, and if the response detecting unit 68 does not detect that the specified information is embedded as the digital watermark information in the icon image data, the device specifying unit 70 specifies the device 12 that transmitted the icon image data to be a second device 12b.

A list preparing unit 78 associates, with each individual device 12, the response information received by the response information receiving unit 67 and information indicating whether the individual device 12 specified by the device specifying unit 70 is a first device or a second device. A list storage unit 80 is disposed, for example, in the storage device 58 and retrievably stores the response information and information, indicating whether a device is a first device or a second device, associated with each individual device 12 by the list preparing unit 78.

A display unit 84 displays the information stored in the list storage unit 80 on the display device 62 and, for example, for a device 12 that returned the response information in response to the response request transmitted from the response request transmitting unit 66, illustrates a position of the device 12 on the network or displays, in a table format, the device 12 that returned the response information along with the information for identifying the device included in the response information. In a case where the transmission and reception of the response request and the response information between the specific computer 10 and the device 12 are performed according to the LLTD protocol, because the information used for realizing a network map function capable of visually displaying the configuration of the network including the devices 12 and the specific computers 10 is included in the response information from the device 12, illustration of the device 12 that returned the response information along with the position of the device 12 on the network can be realized readily.

A display controller 82 performs control so that only the devices, which, among the devices 12 that returned the response information in response to the response request transmitted from the response request transmitting unit 66, were specified as being the first devices by the device specifying unit 70, become the devices 12 that are subject to display by the display unit 84.

A management information request transmission controller 72, a management information request transmitting unit 74, and a management information receiving unit 76, which are other portions shown in FIG. 6, are used in another exemplary embodiment to be described below and description thereof shall be provided later.

Figure 7:
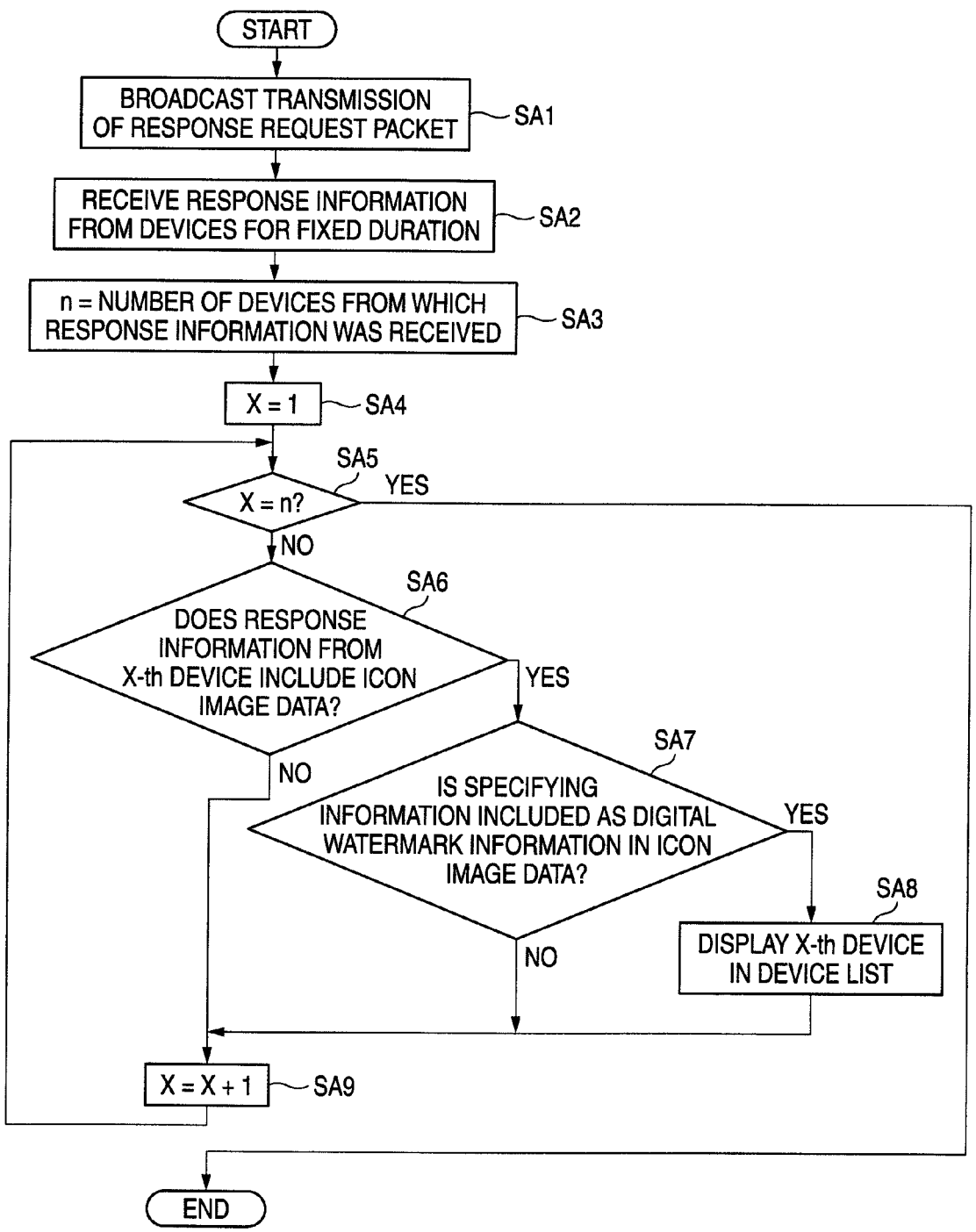
FIG. 7 is a flowchart for describing in outline an example of control operations of the specific computer of FIG. 5, according to an exemplary embodiment of the present invention.

FIG. 7 is a flowchart for describing an example of operations of the device management system 8 and especially of the specific computer 10 in the present exemplary embodiment. In operation (hereinafter, "operation" shall be omitted) SA1 corresponding to the response request transmitting unit 66, the response request is transmitted from the specific computer 10 to the devices 12 via the network. This transmission is, for example, carried out by a broadcast transmission, in which transmission is performed to all equipment present on the same network as the specific computer 10.

In SA2, corresponding to the response information receiving unit 67, the response information, returned in response to the response request transmitted in SA1, is received for a fixed duration. The response information is the response information returned, by the responding units 38 and 50 of the devices 12 that received, by the response request receiving units 36 and 48, the response request transmitted in SA1, to the specific computer that transmitted the response request of SA1. The fixed duration is a duration that has been determined in consideration of, for example, delays in the network so that the response information from all devices 12 that attempt to reply to the response request can be received.

In SA3, a value of a variable n is set to the number of the devices from which the response information was received in SA2. In SA4, a value of a variable X for identifying devices to be noted in reiterative execution of SA5 to SA9, to be described below, is initialized to 1.

SA5 is an operation for determining an ending condition in reiteratively executing SA5 to SA9. In operation SA5, it is determined whether SA5 to SA9 have been executed reiteratively a number of times equal to the number of devices from which the response information was received in SA2. If it is determined that operations SA5 to SA9 have been executed a number of times equal to the number of device form which the response information was received in SA2, that is, if (X=n), operation is ended. On the other hand, if the determination is negative, that is, if (X<n), operation continues to SA6.

In SA6, corresponding to the response detecting unit 68, it is determined whether icon image data are included in the response information received in SA2. If icon image data are not included in the response information received in SA2, the device 12 that returned the response information is deemed as being neither a first device 12a nor a second device 12b and thus deemed as not being a subject of execution of SA8, and SA9 is executed. On the other hand, if icon image data are included in the response information returned in SA2, SA7 is executed.

In SA7, corresponding to the response detecting unit 68 and the device specifying unit 70, the restoration process for restoring embedded digital watermark information is executed on the icon image data included in the response information received in SA2. As a result of the restoration process, it is determined whether the specified information is embedded as digital watermark information in the icon image data included in the response information received in SA2. If the specified information for specifying the device is embedded as digital watermark information in the icon image data, the device 12 that returned the response information is specified as being a first device 12a, and the subsequent SA8 is executed. On the other hand, if the specified information is not embedded as digital watermark information in the icon image data, the device 12 that returned the response information is specified as being a second device 12b and deemed not to be a subject of execution of SA8, and the subsequent SA9 is executed.

In SA8, corresponding to the display controller 82 and the display unit 84, the device specified as the first device 12a in SA7 is displayed on the display device of the specific computer. In this display, a position of the first device 12a on the network is illustrated, or the first device 12a is displayed in a table format along with the information for identifying the device, included in the response information from the first device 12a, or the first device 12a is added to a display that is already being displayed.

In SA9, the value of the variable X is incremented by 1 and operation returns to SA5 to execute the processes of SA6 to SA8 on another device 12 that returned the response information in SA2. The operations are repeated until a determination is made for each device 12 that returned the response information in SA2.

Figures 8, 9:
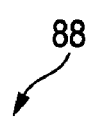
FIG. 8 is a diagram for describing a response request and response information.
FIG. 9 is a diagram for describing an example of a display displayed on a display device of the specific computer of FIG. 5.

FIG. 8 is a diagram for describing an example of the response request transmitted by the response request transmitting unit 66 and an example of the response information returned by the responding units 38 and 50 in response to the response request. A first row LA0 of FIG. 8 indicates the response request, and in the example of FIG. 8, the response request requests each device 12 for the model name of the device, the IP address set in the device, and the icon image data of the icon image expressing the device. Meanwhile, second to fifth rows indicate the response information from the devices 12 and, for example, the response information from the device 12 indicated in the second line LA1 indicates that "Printer A" is the model name of the device, 10.10.1.1 is the IP address, and the icon image data, which are binary data, have been returned. Likewise, the response information from the device 12 indicated in the third line LA2 indicates that "MFP 1" is the model name of the device, 10.10.1.4 is the IP address, and the icon image data, which are binary data, have been returned, and the response information from the device 12 indicated in the fourth line LA3 indicates that "MFP 2" is the model name of the device, 10.10.1.50 is the IP address, and the icon image data, which are binary data, have been returned. Also, the response information from the device 12 indicated in the fifth line LA4 indicates that whereas the model name of the device is acquired as "Printer B" and the IP address is acquired as 10.10.1.51, the icon image data were not acquired. The response request transmitted by the response request transmitting unit 66 and the response information returned by the responding units 38 and 50 of the respective devices 12 are arranged, for example, as in the table shown in FIG. 8 by the list preparing unit 78 and stored in the list storage unit 80.

FIG. 9 is a diagram for describing an example 88, in which a list of the first devices 12a and the information for respectively identifying the first devices 12a are displayed by the display controller 82 and the display unit 84, and shows an example of a display displayed on the display device 62. As shown in FIG. 9, a list of the information acquired based on the response information from the first devices 12a is displayed. Comparing the example of the response information from the respective devices 12 shown in FIG. 8 and the list display shown in FIG. 9, it can be seen that a device, which is indicated as a device returning the response information in the table of FIG. 8 but is not included in the display 88 of FIG. 9, is either a device with which icon image data are not included in the response information, or a device with which the specified information is not included in the icon image data included in the response information.

Figure 10:
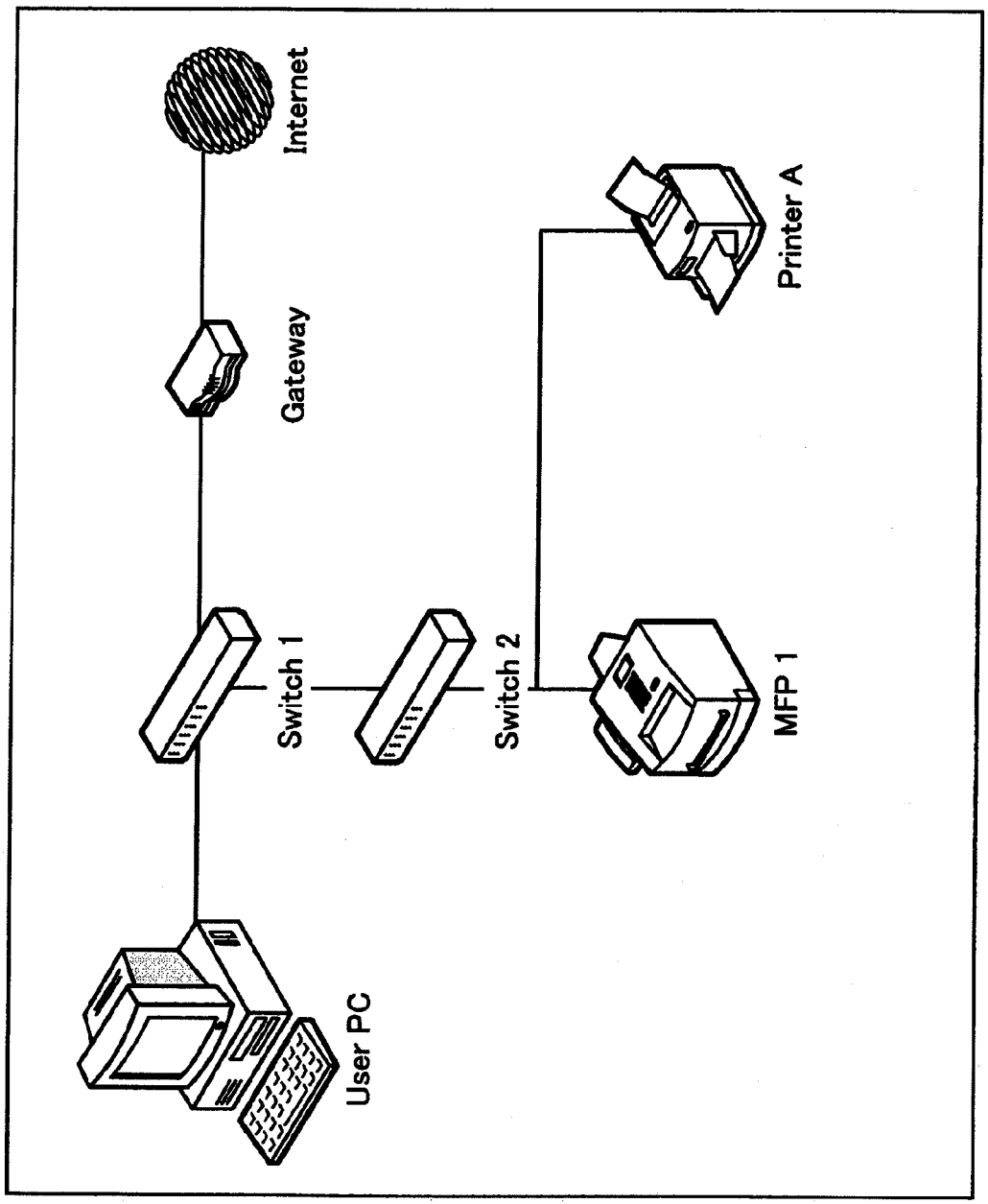
FIG. 10 is a diagram for describing another example of a display displayed on a display device of the specific computer of FIG. 5.

FIG. 10 is a diagram for describing another display example 89 displayed by the display controller 82 and the display unit 84 in regard to the positions of the first devices 12a on the network and is an example of a display that is displayed on the display device 62. That is, FIG. 10 corresponds to FIG. 9 above. Whereas in FIG. 9, a list display using characters is performed as the display 88, the display 89 in FIG. 10 is displayed so that how the specific computer 10 and the first devices 12a are coupled by the network 16 can be discerned using the icon images corresponding to the specific computer 10 and the first devices 12a. According to the flowchart shown in FIG. 7, if for a device coupled to the network, the icon image is not included in the returned response information (i.e., a negative determination is made in SA6) or the specified information is not embedded as digital watermark information in the icon image (i.e., a negative determination is made in SA7), the device is not subject to display (i.e., SA8 is not executed).

Routers, hubs, and other network equipment 14 are also types of devices 12, and thus according to the flowchart of FIG. 7, there is a possibility for these devices not to be subject to the display when the network is illustrated as shown in FIG. 10. On the other hand, in a case of illustrating the network as shown in FIG. 10, information related to whether or not a router, hub, or other network equipment 14 is present is advantageous for grasping the configuration of the network. Thus, when, for example as described above, the LLTD is used as the protocol for the communication between the response request transmitting unit 66 of the specific computer 10 and the response request receiving units 36 and 48 of the devices 12 and the communication between the response information receiving unit 67 of the specific computer 10 and the responding units 38 and 50 of the devices 12, because the response information returned from each device 12 includes the information related to the type of the device 12, the information related to the type of the device 12 may be referenced and in a case where the device is identified as being network equipment 14, it may be made a subject of display even if the icon image is not included in the response information returned from the network equipment 14 or the specified information is not embedded as digital watermark information in the icon image.

With the above described exemplary embodiment, in the device management system 8, because each of the plurality of devices 12 includes the first devices 12a and the second devices 12b, the icon image data indicating the device 12 are stored by the first storage unit 32 or the second storage unit 44, the response request made by the specific computer 10 is received by the first response request receiving unit 36 or the second response request receiving unit 48, and when the first response request receiving unit 36 or the second response request receiving unit 48 receives the response request, the first responding unit 38 or the second responding unit 50 transmits the first response information including the icon image data and the information for identifying the first device 12a stored in the first storage unit 32, or the second response information including the icon image data and the information for identifying the second device 12b stored in the second storage unit, to the specific computer 10. Also, whereas the specified information related to the device is embedded as the digital watermark information in the icon image data stored in the first storage unit 32, the specified information related to the device is not embedded as the digital watermark information in the icon image data stored in the second storage unit 44. Also, because the first response information and the second response information are received by the response information receiving unit 67 included in the specific computer 10, the response detecting unit 68 detects whether or not the specified information is included as the digital watermark information in the icon image data, respectively included in the first response information and the second response information received by the response information receiving unit 67 (SA6, SA7), and the device specifying unit 70 specifies the device that is a transmission source of the response information determined by the response detecting unit 68 to include the specified information, as being the first device 12a and specifies the device that is a transmission source of the response information determined not to include the specified information, as being the second device 12b (SA7), the plurality of devices 12 present on the network can be searched and managed by the response request being transmitted from the response request transmitting unit 66 (SA1) of the specific computer 10 coupled to the network 16 and the specific computer 10 receiving the response information responded respectively by the devices in response to the response request (SA2). Although in the above-described exemplary embodiment, each device 12 is specified by the device specifying unit 70, as being a first device 12a or a second device 12b (SA7) and only the devices specified as being the first devices 12a are displayed by the display controller 82 and the display unit 84 (SA8), some advantages can be obtained even where the operations of the display controller 82 and the display unit 84 (SA8) are not executed and, for example, the information related to which of the devices 12 are the first devices 12a is transmitted to another program without being displayed on the display device 62.

With the above-described exemplary embodiment, because in the first device 12a, the first storage unit 32 stores the icon image data, indicating the first device 12a and in which the specified information related to the device 12 is embedded as the digital watermark information, the first response request receiving unit 36 receives the response request made by the specific computer 10, and the first responding unit 38 transmits the response information, including the icon image data, to the specific computer 10 when the first response request receiving unit 36 receives the response request, the icon image data, indicating the device 12 and in which the specified information related to the device 12 is embedded as the digital watermark information, can be returned as the response information in response to the response request transmitted from the specific computer 10.

Also, with the above-described exemplary embodiment, because the device management program is executed by the specific computer 10, whether or not the specified information is included as the digital watermark information in the icon image data respectively included in the first response information and the second response information received is detected by the response detecting unit 68 (SA6, SA7), and a device 12 that is a transmission source of the response information, which is determined by the response detecting unit 68 to include the specified information, is specified as the first device 12a and a device 12 that is a transmission source of the response information, which is determined not to include the specified information, is specified as the second device 12b by the device specifying unit 70 (SA7), the plurality of devices 12 can be searched and managed based on the response information provided as responses by the respective devices 12.

Also, with the above-described exemplary embodiment, because in the device management system 8 or by the specific computer 10 executing the device management program, the icon images related to the icon image data included in the response signals are displayed on the display device 62 by the display unit 84 (SA8), and the display of the icon images, included in the first response information from devices specified as the first devices 12a by the device specifying unit 70 (SA7), on the display device 62 is controlled by the display controller 82 (SA8) to be performed in the mode where the icon images, included in the second response information from devices specified as the second devices 12b by the device specifying unit 70, are not displayed, display of the mode where the icon images of just the first devices 12a are displayed is enabled.

Exemplary Embodiment 2

Another exemplary embodiment according to the present invention shall now be described. In the following description, portions mutually in common shall be provided with the same symbols and description thereof shall be omitted.

FIG. 3 is the functional block diagram for describing an example of the control functions of the electronic controller 20 of the device 12 that functions as the first device 12a. Because the first storage unit 32, the first response request receiving unit 36, and the first responding unit 38 are the same as those of Exemplary Embodiment 1 described above, description thereof shall be omitted.

The management information storage unit 34 is disposed, for example, in the storage device 24 and readably stores management information that is stored upon being set in advance or renewed in regard to specifications and operation states of the first device 12a. Specifically, the management information includes information related to a network node to which the first device 12a is coupled; information related to functions of the first device 12a, for example, in a case where the first device 12a is a printer; information related to a cumulative number of sheets printed and information related to a remaining amount of a toner; information related to an installation location of the first device 12a; information related to a serial number of the first device 12a; and information related to a current operation state (status) of the first device 12a, etc.

The composite request signal receiving unit 40 receives, via the network interface 30, a composite request signal transmitted by the management information request transmitting unit 74 of the specific computer 10 to be described below to request for return in a batched manner of a plurality of types of management information among the management information stored in the management information storage unit 34, specifically for example, first management information and second management information. When the composite request signal is received by the composite request signal receiving unit 40, the composite management information transmitting unit 42 returns as composite management information, in a batched manner via the network interface 30, the plurality of types of management information, that is, the first management information and the second management information, the return of which is requested by the composite request signal.

FIG. 4 is the functional block diagram for describing an example of the control functions of the electronic controller 20 of the device 12 that functions as the second device 12b. Of these portions, because the second storage unit 44, the second response request receiving unit 48, and the second responding unit 50 are the same as those of Exemplary Embodiment 1 described above, description thereof shall be omitted.

As with the management information storage unit 34 of the first device 12a of FIG. 3 described above, the management information storage unit 46 is disposed, for example, in the storage device 24 and readably stores management information that is stored upon being set in advance or renewed in regard to specifications and operation states of the second device 12b. Specifically, the management information includes information related to a network node to which the second device 12b is coupled; information related to functions of the second device 12b, for example, in a case where the second device 12b is a printer; information related to a cumulative number of sheets printed and information related to a remaining amount of a toner; information related to an installation location of the second device 12b; information related to a serial number of the second device 12b; and information related to a current operation state (status) of the second device 12b; etc. The management information storage unit 34 of the first device 12a and the management information storage unit 46 of the second device 12b do not necessarily store the same types of management information and for example, the types of management information stored in the management information storage unit 34 of the first device 12a are not stored in the management information storage unit 46 of the second device 12b.

The singular request signal receiving unit 52 receives, via the network interface 30, a singular request signal transmitted by the management information request transmitting unit 74 of the specific computer 10 to be described below to requests for return of management information among the management information stored in the management information storage unit 46, specifically for example, either the first management information or the second management information. When the singular request signal is received by the singular request signal receiving unit 52, the singular management information transmitting unit 54 returns, via the network interface 30, the single type of management information (i.e., either the first management information or the second management information), the return of which is requested by the singular request signal.

FIG. 6 is the functional block diagram for describing an example of the control functions of the electronic controller 56 of the specific computer 10. Because the response request transmitting unit 66, the response information receiving unit 67, the response detecting unit 68, and the device specifying unit 70 are the same as those of Exemplary Embodiment 1 described above, description thereof shall be omitted.

The management information request transmission controller 72 controls the management information request transmitting unit 74 to switch the type of the management information request signal transmitted by the management information request transmitting unit 74 according to each of the transmission source devices of the response information received from the devices by the response information receiving unit 67. Specifically in accordance with each of the transmission source devices of the response information received from the devices by the response information receiving unit 67, the management information request transmitting unit 74 is switched so that the management information request transmitting unit 74 transmits the composite request signal to devices specified as the first devices 12a by the device specifying unit 70 and transmits the singular request signal to devices specified as the second devices 12b by the device specifying unit 70.

The management information request transmitting unit 74 transmits the management information request signal, requesting for transmission of management information, to each of the transmission source devices of the response information received from the devices by the response information receiving unit 67. Here, as described above, the management information request signal transmitted by the management information request transmitting unit 74 is switched between the composite request signal and the singular request signal by the management information request transmission controller 72 according to whether the transmission destination device is a first device 12a or a second device 12b. The composite request signal requests for return in a batched manner of the plurality of types of management information that a first device 12a has, specifically for example, the first management information and the second management information. The singular request signal specifies and requests the return of either the first management information or the second management information among the plurality of types of management information that the devices 12 have. That is, in a case where the devices 12 have the first management information and the second management information, there are two type of singular request signal: a first request signal, requesting return of the first management information, and a second request signal, requesting return of the second management information.

The management information receiving unit 76 receives the management information returned from the devices 12 that have received the management information request signals transmitted by the management information request transmitting unit 74.

Here, a protocol for performing transmission and reception of management information among equipment on the network, especially a protocol enabling batch inquiry for a plurality of management information items is employed for communication between the management information request transmitting unit 74 of the specific computer 10 and the composite request signal receiving units 40 of the first devices 12a or the singular request signal receiving units 52 of the second devices 12b and communication between the composite management information transmitting units 42 of the first devices 12a or the singular management information transmitting units 54 of the second devices 12b and the management information receiving unit 76 of the specific computer 10, respectively. The protocol for transmission and reception of the management information is advantageously a protocol that is installed in a simple manner so as to enable processing loads of the devices 12 to be lightened. A protocol that differs from the above-described first protocol used for transmission and reception of the response request and the response information is advantageously used. For example, a protocol, such as simple network management protocol (SNMP), is employed. With such a protocol, specifications are defined so that if, with a device receiving a batch inquiry for a plurality of types of management information, management information not stored by the device is included among the plurality of types of management information related to the inquiry, for example, an error message is returned, etc., and none of the plurality of types of management information related to the batch inquiry is returned.

For example, the management information stored in a device may include basic management information, made up of definitions in common among devices connected by a network and stored by the devices connected to the network, and extension management information, made up of definitions uniquely extended by a vendor or a manufacturer of a device and stored only by devices distributed by a specific vendor or manufactured by a specific manufacturer. In the case of extension management information, the extension management information stored by devices manufactured by a certain specific manufacturer may not be stored by devices manufactured by manufacturers differing from the specific manufacturer. In this case, a management information requesting composite request signal includes a request for the extension management information, which is stored only by the devices manufactured by the specific manufacturer, and the basic management information in a batch. When the management information requesting composite signal is transmitted to a device manufactured by a manufacturer other than the specific manufacturer, an error message is returned from the device that received the composite request signal. That is, a problem may occur such that whereas when return of management information is requested by a singular request signal that requests for the basic management information singularly, the basic management information is acquired even from a device manufactured by a manufacturer other than the specific manufacturer, when return of management information is requested by a management information requesting composite request signal that requests for the extension management information stored only in the devices manufactured by the specific maker and the basic management information in a batch, not even the basic management information can be acquired. The management information corresponds to MIB in the SNMP.

In regard to this problem, by acquiring the manufacturer name and the vendor name from the devices 12 respectively in advance and by changing the type of management information requested in the composite request information according to the acquired manufacturer name and vendor name to enable composite request information, to which the devices 12 can respond, to be transmitted according to each device 12, the problem where a return from a device 12 cannot be obtained due to requesting the device 12 to return management information not stored by the device 12 can be avoided.

The manufacturer name and the vendor name of a device 12 are generally included in the basic management information. Thus, a method of acquiring the management information of a device in two stages, that is, a method of carrying out acquisition in a first stage, in which basic management information stored in common by respective devices is requested to and returned by the respective devices, and in a second stage, in which the respective devices are classified, based on the manufacturer name, the vendor name, and other information included in the acquired basic management information, into groups each storing extension management information in common and, with the devices of the respective groups, the extension management information stored in common is requested and returned according to each group, may be considered.

However, in a case where the manufacturer name and the vendor name are stored as management information, even in a case where a device is supplied by OEM production, storing of the manufacturer name and the vendor name of the distribution source is generally practiced. There are also cases where, in a device manufactured by OEM production, extension management information defined by an OEM manufacturer that actually manufactured the device is stored. In this case, the following problem occurs when the above-described acquisition of device management information in two stages is performed. That is, because the manufacturer name and the vendor name of the device are acquired from the basic management information, the manufacturer name and the vendor name of the device supplied by OEM production will be those of the distribution source. It is thus recognized that the manufacturer of the device is the distribution source that differs from the OEM manufacturer that defined the extension management information. When the extension management information defined by the distribution source is requested of the device, because the device actually has the extension management information defined by the OEM manufacturer, a reply cannot be made to the request for the management information including the extension management information. This problem occurs not only in such a case of OEM production but may also occur in a case where the manufacturer name and the vendor name stored as the basic management information in the device are changed.

As mentioned above, information, including information related to the manufacturer name, is embedded as the specified information in the form of the digital watermark information in the icon image data stored by the device. The information related to the manufacturer name that is included in the specified information is the manufacturer name that is also a name of a distributing company in a case where the device is sold under the company name (brand) of the manufacturer that actually manufactured the device, and is information related to the manufacturer name of an OEM manufacturer that actually manufactured the device in a case of manufacture by OEM. Here, in place of the method of acquiring the management information of the device in two stages, the management information can be acquired by the following method. First, a request for response information is made to the device, and by obtaining the reply of the response information from the device and performing the restoration process on the icon image data included in the response information, information related to the OEM manufacturer name is obtained as the specified information embedded as the digital watermark information in the icon image data. Then in this method, a second stage is performed in which, based on the information related to the OEM manufacturer name acquired as the specified information, the respective devices are classified into groups that each store extension management information in common, and the extension management information stored in common by the devices of each group is requested and returned according to each group.

By this method, because the icon image data are included in the response information acquired from the device and the name of the OEM manufacturer that actually manufactured the device is included as the specified information embedded as digital watermark information in the icon data, the name of the OEM manufacturer that actually defined the extension management information can be acquired. Then, based on the OEM manufacturer name acquired, inquiry of the management information, including the extension management information that the device can return, can be performed. Specifically, by transmitting, to each first device 12a, having both the first management information and the second management information, the composite request signal requesting for transmission of the composite management information including the first management information and the second management information, transmitting, to each device having only the first management information, the first request signal requesting for transmission of the first management information, and transmitting, to each device having only the second management information, the second request signal requesting for transmission of the second management information, the inquiries can be made returnable by the devices.

The list preparing unit 78 associates, in addition to the response information received by the response information receiving unit 67 and the information indicating whether an individual device specified by the device specifying unit 70 is a first device or a second device, the management information of each device 12 acquired by the management information receiving unit 76 with each individual device 12. The list storage unit 80 is disposed in the storage device 58 and retrievably stores the response information, the information, indicating whether a device is a first device or a second device, and the management information of each device 12 acquired by the management information receiving unit 76 associated with each individual device 12 by the list preparing unit 78.

The display unit 84 displays the information stored in the list storage unit 80 on the display device 62, and for example, for a device 12 that returned the response information in response to the response request transmitted from the response request transmitting unit 66, illustrates a position of the device 12 on the network and displays the management information of the device acquired by the management information receiving unit, or displays the device 12 that returned the response information along with the information for identifying the device included in the response information and the management information of the device 12 obtained by the management information receiving unit 76 in a table format.

The display controller 82 performs control so that only the devices, which, among the devices 12 that returned the response information in response to the response request transmitted from the response request transmitting unit 66, were specified as being the first devices by the device specifying unit 70, become the devices 12 that are subject to display by the display unit 84.

Figure 11:
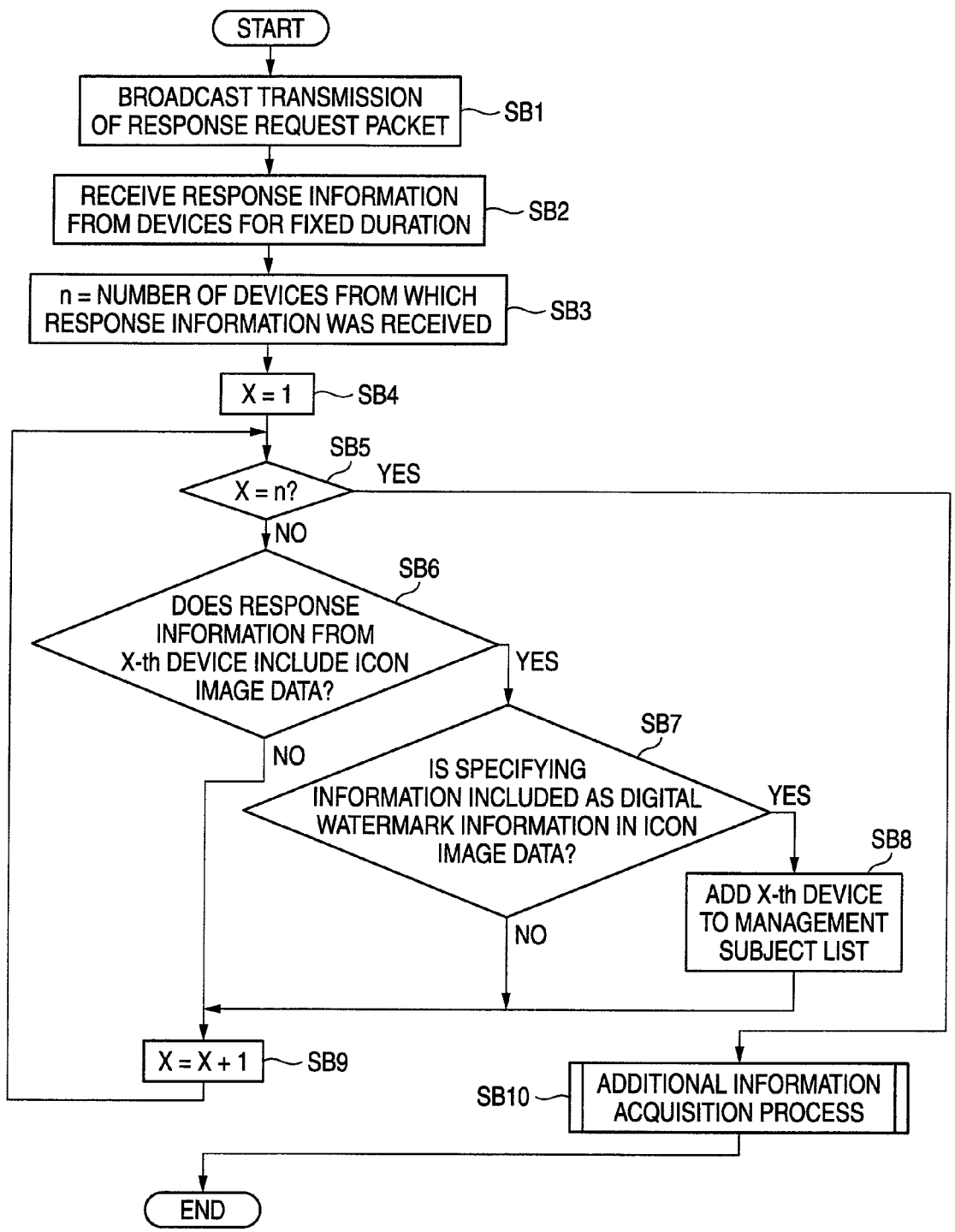
FIG. 11 is a flowchart for describing in outline an example of control operations according to another exemplary embodiment o to the present invention.

FIG. 11 is a flowchart for describing operations of the device management system 8 and especially of the specific computer 10 in the present exemplary embodiment. Operations (hereinafter, "operation" shall be omitted) SB1 to SB7 and SB9 correspond to SA1 to SA7 and SA9 of the flowchart of FIG. 7 in Exemplary Embodiment 1 described above, and because the same operations are performed in these operations, description thereof shall be omitted.

In SB8, corresponding to the list preparing unit 78 and the list storage unit 80, a management information list, including a list of the devices 12 specified as the first devices 12a in SB7, is generated and stored in the storage device 58.

SB10 is an operation that is executed when an affirmative determination is made in SB5, that is, when SB5 to SB9 have been executed reiteratively a number of times equal to the number of devices from which the response information was received in SB2, and an additional information acquisition process routine for further acquiring the management information, which is information related to the devices besides the response information received in SB2, is executed.

Figure 12:
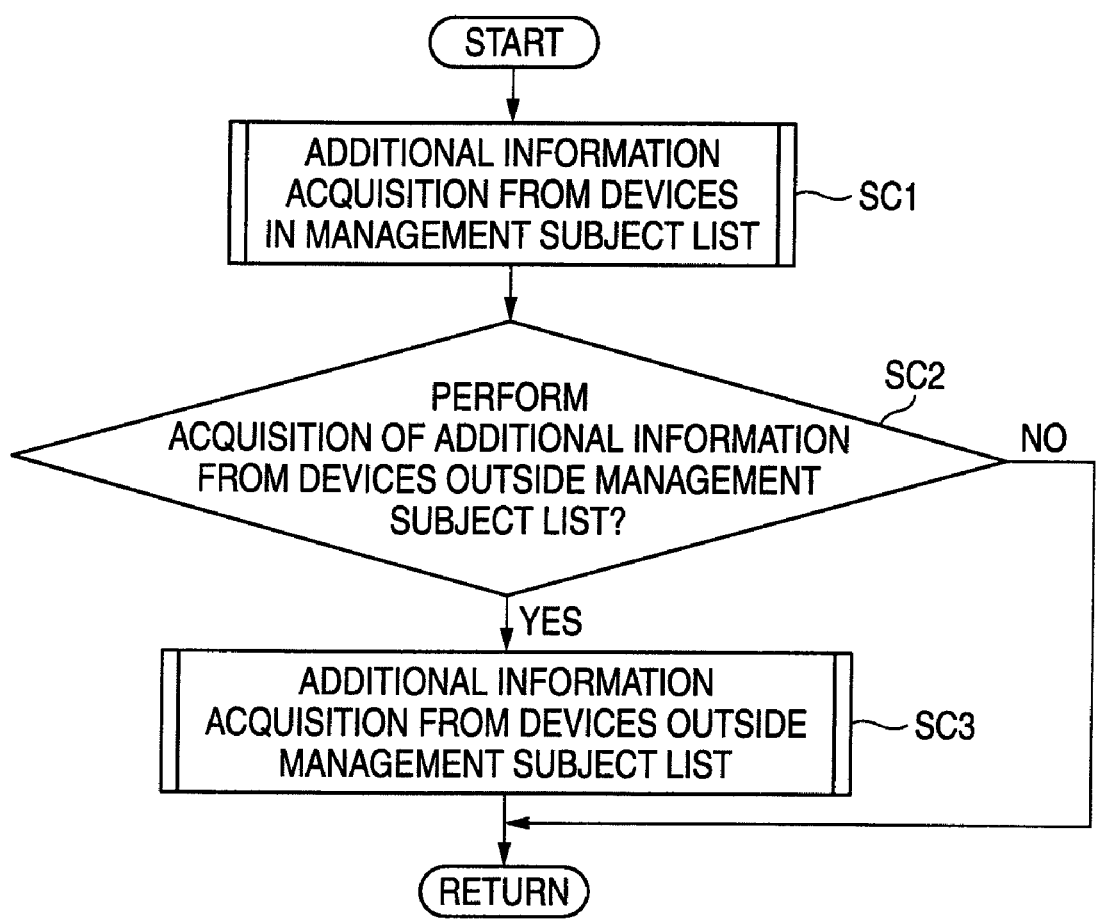
FIG. 12 is a flowchart for describing a routine, executed in the flowchart of FIG. 11, for acquiring additional information.

FIG. 12 is a flowchart for describing the additional information acquisition process routine. First, in SC1, acquisition of additional information related to the devices 12 included in the management information list in SB8 in the flowchart of FIG. 11 (i.e., the first devices 12a) is performed.

Figure 13:
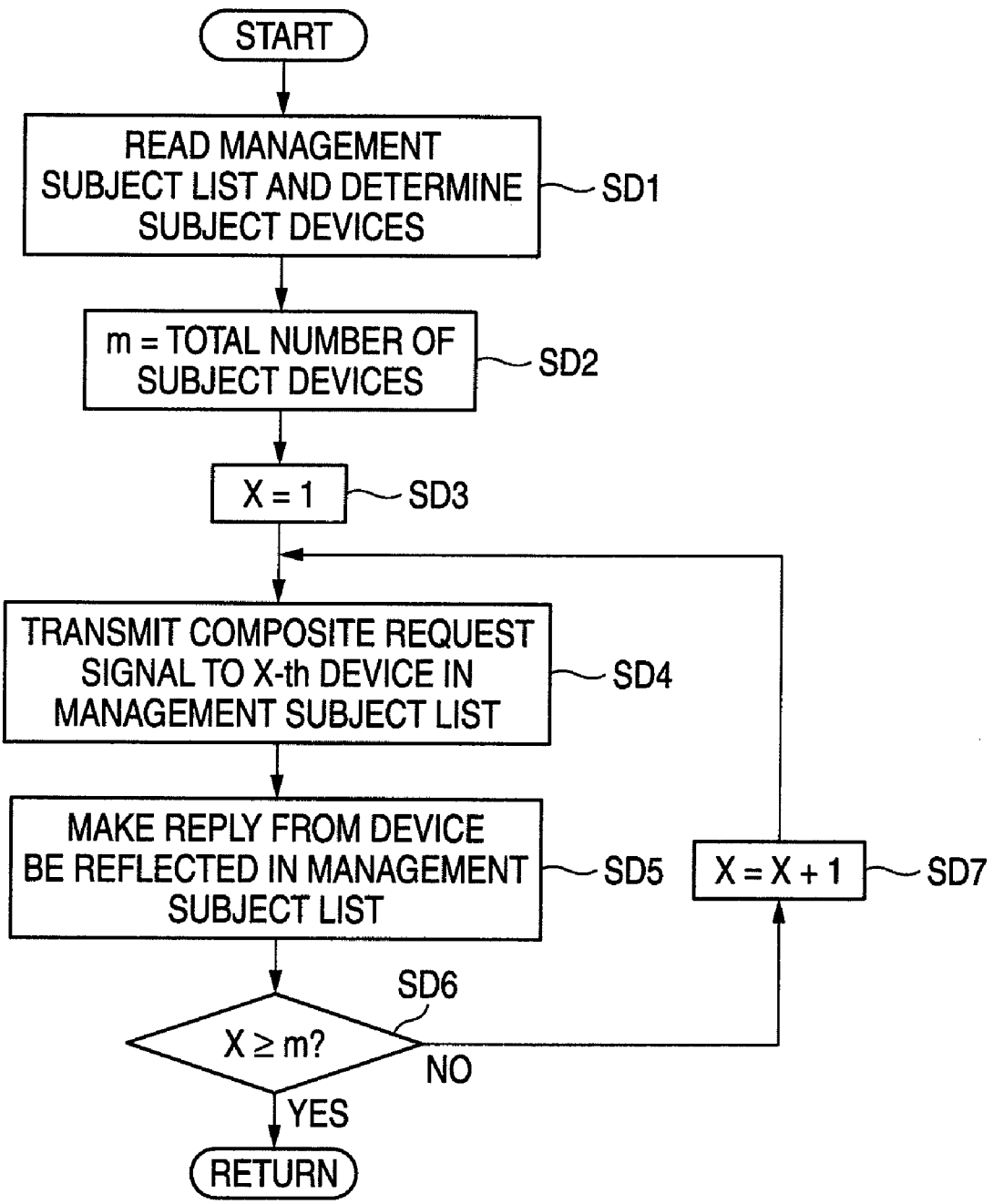
FIG. 13 is a flowchart for describing a routine, executed in the flowchart of FIG. 12, for acquiring additional information from devices that are registered in a management subject list.

FIG. 13 is a flowchart for describing acquisition of the additional information with respect to the devices that were included in a management subject list in SC1. In SD1, the management information list prepared in SB8 in the flowchart of FIG. 11 is read and the devices to be subject to the acquisition of the additional information in the present routine are determined.

In SD2, a value of a variable m is set to a total number of devices determined to be subject to the acquisition of the additional information in SD1. In SD3, a value of a variable X for identifying devices, from which the additional information is to be requested in reiterative execution of SD4 to SD7, to be described below, is initialized to 1.

In SD4, corresponding to the management information request transmission controller 72 and the management information request transmitting unit 74, the management information request signal requesting for transmission of the management information is transmitted to the devices 12 from the specific computer 10. In a case where the present routine is executed, because the devices, determined to be subject to the acquisition of the additional information in SD1, are the devices recorded in the management information list prepared in SB8 in the flowchart of FIG. 11 (i.e., the first devices 12a), the management information request signal that is transmitted is the composite request signal requesting for return of the first management information and the second management information in a batch.

In SD5, corresponding to the management information receiving unit 76, the device management information returned from the devices that received the management information request signal transmitted in SD4 is received. Because as mentioned above, the management information request signal transmitted in SD4 is the composite request signal requesting for return of the first management information and the second management information in a batch, the management information received in the present operation is information in which the first management information and the second management information are arranged together, specifically for example, an information packet in which both information, that is, the first management information and the second management information are included in a single packet.

SD6 is an operation for determining an ending condition in reiteratively executing SD4 to SD7, and in this operation, it is determined whether or not SD4 to SD7 have been executed reiteratively a number of times equal to the number m of devices determined to be subject to the acquisition of the additional information in SD1. If it is determined that (X=m), operation is ended. On the other hand, if it is determined that (X<m), SD7 is executed and thereafter, SD4 and onward are executed again.

In SD7, the value of the variable X is incremented by 1 to execute the processes of SD4 to SD6 on another device 12 determined to be subject to the acquisition of the additional information in SD1.

Returning now to FIG. 12, in SC2, whether or not the acquisition of additional information is to be performed on devices 12 other than the devices 12 listed in the management information list prepared in SB8 in the flowchart of FIG. 11 (i.e., the first devices 12a) is determined based, for example, on an input via the input unit 60 (see FIG. 5). If an option is set to perform the acquisition of additional information on the devices other than the devices 12 listed in the management information list, an affirmative determination is made in the present operation and SC3 is executed. On the other hand, if the option is not set to perform the acquisition of additional information on the devices other than the devices 12 listed in the management information list, a negative determination is made in the present operation and operation is ended.

Figure 14:
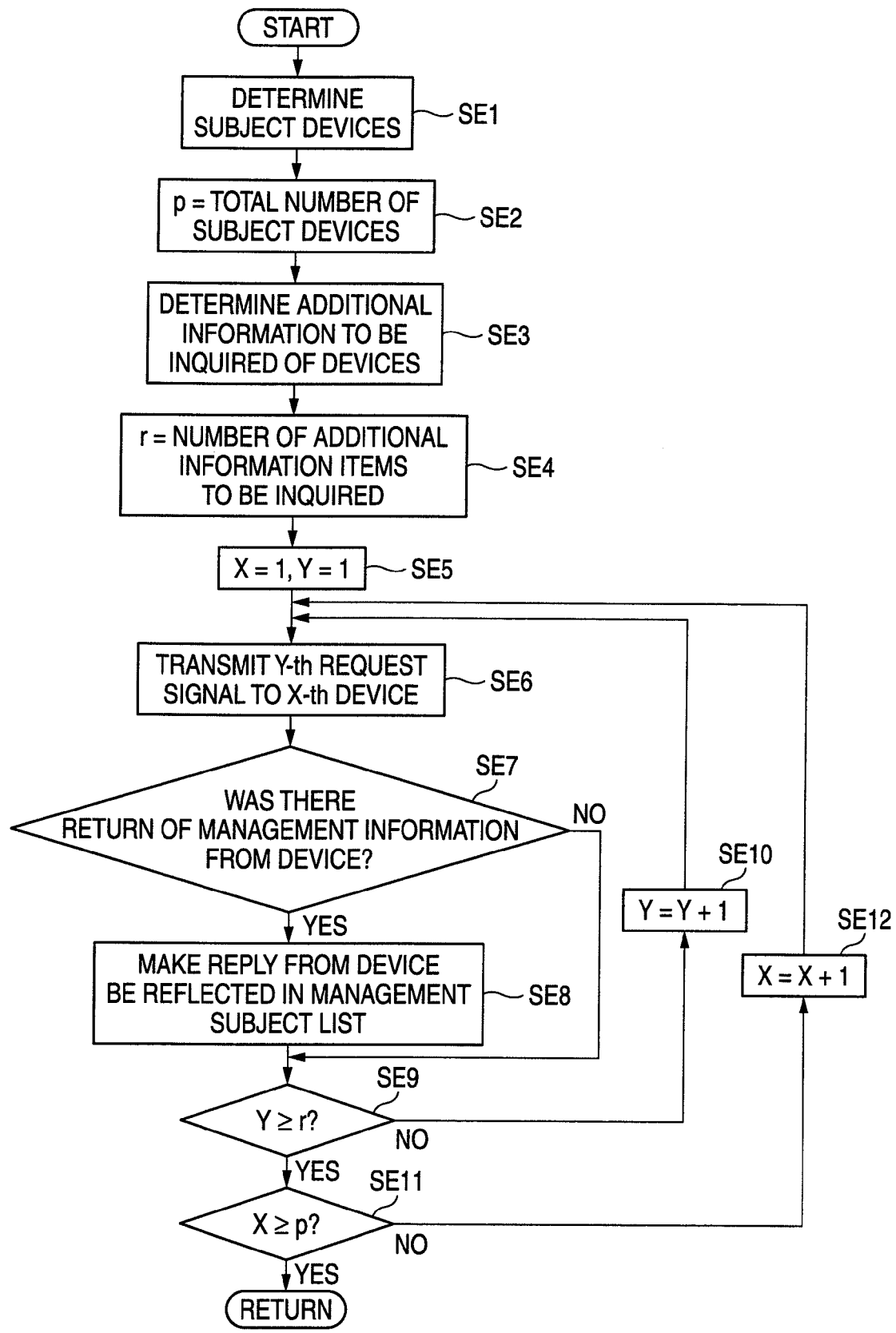
FIG. 14 is a flowchart for describing a routine, executed in the flowchart of FIG. 12, for acquiring additional information acquisition from devices that are not registered in a management subject list.

FIG. 14 is a flowchart for describing an example of a control operation in the routine, executed in SC3 of the flowchart of FIG. 12, for acquiring additional information on the devices other than the devices 12 listed in the management information list. In SE1, the devices 12, which, among the devices 12 that are the transmission sources of the response information received in SB2 in the flowchart of FIG. 11, are not recorded in the management information list prepared in SB8, are determined as being the devices 12 to be subject to the acquisition of the additional information in the present routine. In SE2, a value of a variable p is set to a total number of the devices determined in SE1 to be subject to the acquisition of the additional information.

In SE3, the type of the additional information to be inquired of the devices determined to be subject to the inquiry for the additional information in SE1 is determined. That is, it is determined which of the plurality of types of management information that the devices 12 store in the management information storage units 34 and 46 is to be requested to be returned by the devices 12. Specifically for example, in a case where at least one of the first management information and the second management information is stored in the management information storage units 34 and 46, it is determined whether to request the devices 12 for the return of the first management information, to request for the return of the second management information, or to request for both of the first management information and the second management information. Also, in SE4, a value of a variable r is set to the number of management information items determined to be requested to be returned by the devices 12 in SE3.

In SE5, a value of a variable X for identifying devices, from which the additional information are to be requested in reiterative execution of SE6 to SE12, to be described below, is initialized to 1, and a value of a variable Y for identifying the management information inquired is initialized to 1.

In SE6, corresponding to the management information request transmission controller 72 and the management information request transmitting unit 74, the management information request signal requesting for transmission of the management information is transmitted to the devices 12 from the specific computer 10. In a case where the present routine is executed, because the devices, determined to be subject to the acquisition of the additional information in SE1, are the devices not recorded in the management information list prepared in SB8 in the flowchart of FIG. 11 (i.e., the second devices 12b), the management information request signal that is transmitted is the singular request signal requesting for return of one of either the first management information or the second management information singularly.

In SE7, corresponding to the management information receiving unit 76, it is determined whether or not the management information of the device 12 that is returned from the device 12 that received the management information request signal transmitted in SE6 has been received. Because as mentioned above, the management information request signal transmitted in SE6 is the singular request signal requesting for return of one of either the first management information or the second management information singularly, the management information received in the present operation is one of either the first management information or the second management information. Meanwhile, as mentioned above, only one of either the first management information or the second management information is stored in the management information storage unit 46 of the second device 12b. Thus, in a case where a management information request signal requesting the return of management information of a type stored in the management information storage unit 46 of the second device 12b is transmitted in SE6, because the second device 12b returns the management information requested in the management information request signal and the management information is received by the specific computer 10, an affirmative determination is made in the present operation and SE8 is executed. On the other hand, in a case where a management information request signal requesting the return of management information of a type that is not stored in the management information storage unit 46 of the second device 12b is transmitted in SE6, because the second device 12b cannot return the management information requested in the management information request signal and the management information is not received by the specific computer 10, a negative determination is made in the present operation and SE9 is executed without SE8 being executed.

Specifically for example, if the first management information request signal requesting for transmission of the first management information is transmitted in SE6 to a second device 12b storing only the first management information in the management information storage unit 46, the first management information is returned from the second device 12b and the affirmative determination is made in the present operation. On the other hand, if the second management information request signal requesting for transmission of the second management information is transmitted in SE6, the second device 12b does not return the second management information but returns, for example, an error message, and the negative determination is made in the present operation.

SE8 is an operation executed if the determination in SE7 is affirmative, and the management information received in SE7 in response to the management information request signal transmitted in SE6 is stored in association with each device 12.

SE9 is an operation for determining an ending condition in reiteratively executing SE6 to SE8, and in this operation, it is determined whether or not, for a single device 12 among the devices determined to be subjects in SE1, SE6 to SE8 have been executed reiteratively a number of times equal to the number r of management information items determined in SE3 to be the subject of additional information acquisition. If the determination in this operation is affirmative, that is, if (Y=r), the process proceeds to SE11. On the other hand, if the determination in this operation is negative, that is, if (Y<r), after execution of SE10, SE6 and onward are executed again.

In SE10, the value of the variable Y is incremented by 1 to execute the processes of SE6 to SE8 for acquiring another management information item determined to be subject to additional acquisition in SE3.

SE11 is an operation for determining an ending condition in reiteratively executing SE6 to SE10, and in this operation, it is determined whether or not SE6 to SE10 have been executed reiteratively a number of times equal to the number p of devices determined to be subject to the acquisition of the additional information in SE1. If the determination in this operation is affirmative, that is, if (X=p), operation is ended. On the other hand, if the determination in this operation is negative, that is, if (X<p), SE12 is executed and thereafter, SE6 and onward are executed again.

In SE12, the value of the variable X is incremented by 1 to execute the processes of SE6 to SE10 on another device 12 determined to be subject to the acquisition of the additional information in SE12.

FIG. 15 is a diagram for describing an example of the management information requested to be returned by the devices by the management information request signal transmitted by the management information request transmitting unit 74, and an example of the management information transmitted by the composite management information transmitting unit 42 or the singular management information transmitting unit 54 in response to management information request signal. A first row LB0 in FIG. 15 indicates the management information requested by the management information request signal. For example, the information is, for example, information related to a node name, information related to the number of sheets printed, information related to the installation location, information related to the serial number, and information related to the status of the device, etc.

Meanwhile, a second row to a fifth row indicate the management information acquired from the devices 12 by execution of the flowcharts of FIGS. 11 to 14 and, for example, the management information acquired from a device 12 shown in the second row LB1 indicates that the name of the node to which the device is coupled is BRN0001, the number of sheets printed is 12556, the installation location is a fifth-floor office, the serial number is AAN000120, and the status is "Ready" (i.e., an operation-enabled state). Likewise, the management information acquired from a device 12 shown in the third row LB2 indicates that the name of the node is BRN0002, the number of sheets printed is 15, the installation location is a fourth-floor design room, the serial number is AAN00152, and the status is "Sleep" (i.e., a power-saving state), and the management information acquired from a device 12 shown in the fourth row LB3 indicates that the name of the node is BRN00A0, the number of sheets printed is 1064, the installation location is a first floor reception room, the serial number is MPN010520, and the status is "Toner Low" (i.e., a low-toner state). Also, the management information acquired from a device 12 shown in the fifth row LB4, while indicating that the name of the node is BRN00AC, the installation location is a first-floor office, the serial number is MSC013925, and the status is "Ready," indicates that data could not be obtained in regard to the number of sheets printed, which is one of the management information items.

In the present case, the devices corresponding to the second row LB1 to the fourth row LB3 of FIG. 15 are specified as being first devices 12a by the device specifying unit 70, and the device corresponding to the fifth row LB4 is specified as being a second device 12b. If, among the management information requested by the management information request signal, the information related to the node name, the information related to the installation location, the information related to the serial number, and the information related to the status are the first management information and the information related to the number of sheets printed is the second management information, the devices corresponding to the second row LB1 to the fourth row LB3 of FIG. 15 have the first management information and the second management information stored in the management information storage units 34, and the device corresponding to the fifth row LB4, although having the first management information stored in the management information storage unit 46, does not have the second management information.

The management information request transmitting unit 74 thus transmits the composite request signal requesting the return of the first management information and the second management information in a batch to the devices corresponding to the second row LB1 to the fourth row LB3 of FIG. 15 and transmits the singular request signal requesting the return of the first management information to the device corresponding to the fifth row LB4. This is because, as mentioned above, even when the composite request signal requesting the return of the first management information and the second management information in a batch is transmitted to the device corresponding to the fifth row LB4, the device cannot perform a reply and because the singular request signal must be transmitted to request the return of the first management information again.

FIG. 16 is a diagram for describing an example 90 of the present exemplary embodiment, in which a list of the first devices 12a and the information for respectively identifying the first devices 12a are displayed by the display controller 82 and the display unit 84, and shows an example of a display displayed on the display device 62. As shown in FIG. 16, a list of the information acquired by the response information from the first devices 12a and the information acquired as management information is displayed. In this display, not of all of the types of response information and management information need to be displayed and, for example, just the types of response information and management information that have been set to be displayed may be displayed. In FIG. 16, just the model name, the IP address, the node name, and the status are displayed as an example.

In the above-described exemplary embodiment, because in the computer 10 in which the device management program is executed, the singular request signal, and the composite request signal are transmitted to the devices 12 by the management information request transmitting unit 74 (SD4, SE6), control by the management information request transmission controller 72 (SD4, SE6) is performed. Thus, in the transmission to the devices 12 via the management information request transmitting unit 74, the management information request transmitting unit 74 is controlled to transmit the first request signal and the second request signal respectively to the second devices 12b, and the management information request transmitting unit 74 is controlled on the other hand to transmit the composite request signal to the first devices 12a. Thus, the first management information and the second management information, transmitted from the devices 12 in accordance with the receiving of the first request signal, the second request signal, and the composite request signal, are received by the management information receiving unit 76 (SD5, SE7). Each first device 12a includes the composite request signal receiving unit 40, receiving the composite request signal, and the composite management information transmitting unit 42, transmitting, when the composite request signal receiving unit 40 receives the composite request signal, the first management information and the second management information to the specific computer 10. Each second device includes the singular request signal receiving unit 52, receiving one of either the first request signal or the second request signal, and the singular management information transmitting unit 54, transmitting, when the singular request signal receiving unit 52 receives one of either the first request signal or the second request signal, either the first management information or the second management information in correspondence to the received signal to the specific computer 10. Accordingly, the specific computer 10 can control transmission of the management information transmission request according to whether the devices 12 are the first devices 12a or the second devices 12b, and for example, performing of the transmission request again due to a reply not being obtained because the composite request signal was transmitted to the second devices 12b, which can only return the first management information, etc., can be prevented without the specific computer 10 having to have correspondence information, with which information related to the specified information is stored in correspondence to each individual device 12, and identify the specified information of each device 12 based on the correspondence information.

Also, in the above-described embodiment, because in regard to transmission and reception performed between the specific computer 10 and the devices 12, the transmission and reception of the response request and the response information are performed using the LLTD, which is the first communication protocol, and the transmission and reception of the first request signal, the second request signal, and the composite request signal, and the first management information and the second management information are performed using the SNMP, which is the second communication protocol, contents of the request signal can be changed to the first request signal, the second request signal, or the composite request signal using the second communication protocol based on the response information acquired using the first protocol. Also, the response request transmitting unit 66 can favorably transmit the response request using the LLTD that is a protocol with which transmission and reception of icon image data are defined, the response information receiving unit 67 can receive the responses, the management information request transmitting unit 74 can transmit the management information request using the SNMP, which is a simpler protocol, and the management information receiving unit 76 can receive the response.

Although exemplary embodiments of the present invention have been described above in detail based on the drawings, the present invention can be applied to other modes as well.

For example, although in the exemplary embodiments described above, each first device 12a includes the composite request signal receiving unit 40 and the composite management information transmitting unit 42, and each second device 12b includes the singular request signal receiving unit 52 and the singular management information transmitting unit 54, the present invention is not limited to such a mode. For example, each device 12 may include all of the composite request signal receiving unit 40, the composite management information transmitting unit 42, the singular request signal receiving unit 52, and the singular management information transmitting unit 54, and arrangements may be made so that in a case where a device is specified as a first device 12a, the composite request signal is received by the composite request signal receiving unit 40 and the composite management information transmitting unit 42 returns the first management information and the second management information in a batch and in a case where a device is specified as a second device 12b, the singular request signal is received by the singular request signal receiving unit 52 and the singular management information transmitting unit 54 returns one of either the first management information or the second management information.

Also, although in the exemplary embodiments described above, a distinction is made such that a device that is a transmission source of response information not including icon image data is deemed to be neither a first device nor a second device by the response detecting unit 68 (SA6), and a device that is a transmission source of response information, with which specified information is not included as digital watermark information in the icon image data, is deemed to be a second device 12b by the device specifying unit 70, the present invention is not restricted to such a mode. That is, as long as a device that is a transmission source of response information, with which specified information is included as digital watermark information in the icon image data, is deemed to be a first device 12a, a certain effect can be obtained even if devices other than the first devices 12a are not distinguished.

Also, in the exemplary embodiments described above, the device specifying unit 70 specifies a device 12 as being a first device 12a or a second device 12b based on whether or not the specified information is embedded as digital watermark information in the icon image date included in the response information that the response detecting unit 68 received from the device 12. Although here, the determination of whether or not the specified information is included is made based on whether or not specified information is included, the present invention is not restricted to such a mode. The specified information may be predetermined. For example, the specified information may be specified information of a first type, set in advance by an operator, and the determination may be made based on whether the specified information included as the digital watermark information is the specified information of the first type or is specified information of a type other than the specified information of the first type. More specifically, for example, in a case where the specified information of the first type is information related to a manufacturer name, the determination between a first device 12a and a second device 12b can be made based on whether or not the information related to the manufacturer name is included as the specified information. In this case, if the information related to the manufacturer name is included as the specified information, the device can be specified as being a first device 12a, and if information related to a manufacturer name that is not the predetermined manufacturer name is included as the specified information, the device can be specified as being a second device 12b.

Figure 17:
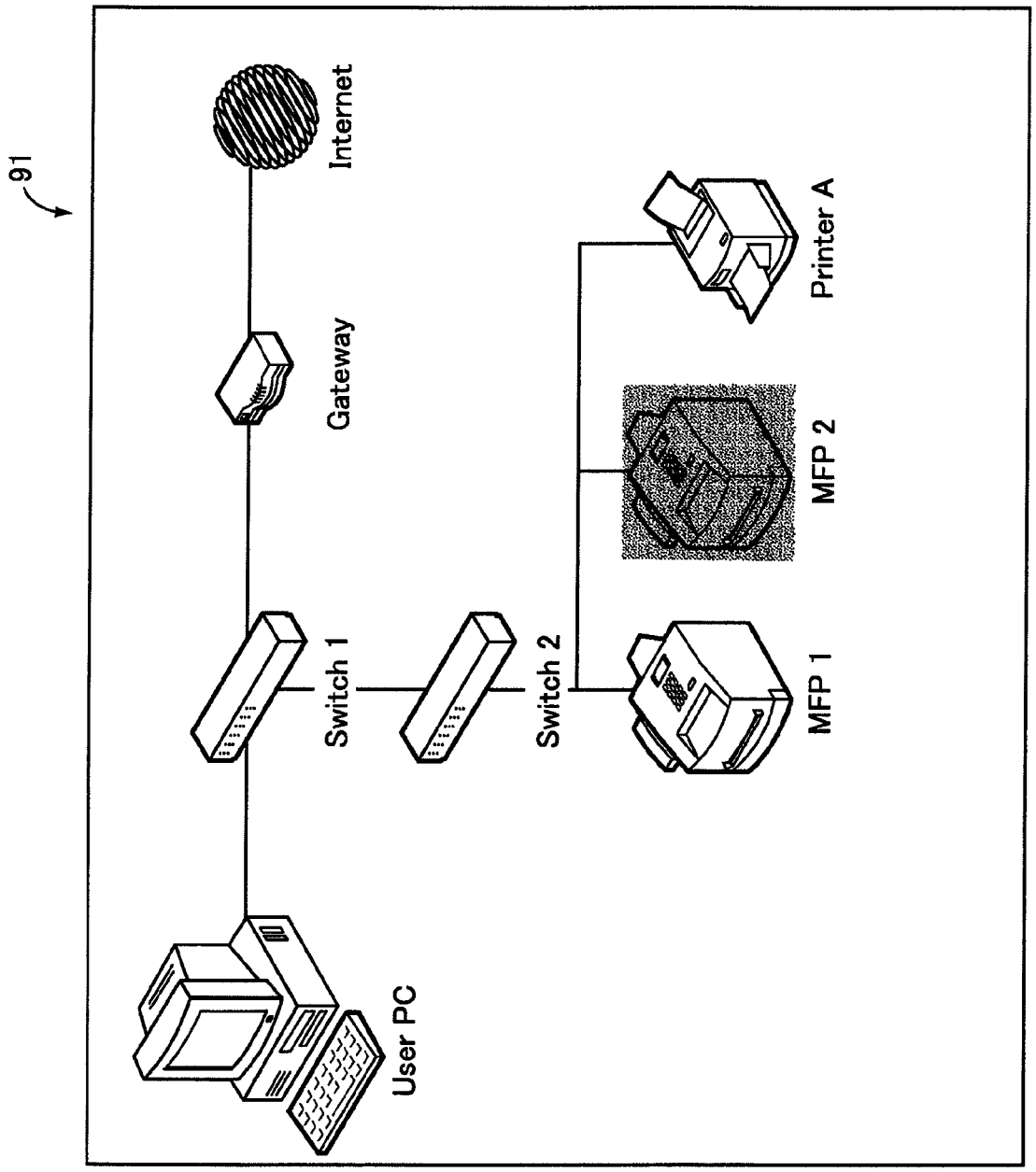
FIG. 17 is a diagram for describing another example of a display displayed on a display device of the specific computer of FIG. 5.

Also, in the exemplary embodiments described above, when the display unit 84 performs a list display of the devices 12 in a table form as shown in FIG. 9 or in a form expressing connection with the network using icon images as shown in FIG. 10, control may be performed by the display controller 82 so that just the first devices 12a are displayed, or control may be performed so that both the first devices 12a and the second devices 12b are displayed together as shown in FIG. 16 and so that the first devices 12a and the second devices 12b are displayed in a distinguishable manner. Specifically for example, information that a device is a second device may be displayed by displaying that an error occurred in acquisition of the management information as shown in the table of FIG. 16, or in a case where the network connection form is expressed using icon images, for example, the icon images of the second devices 12b may be lowered in luminance and displayed so as to be distinguishable from the icon images of the first devices 12a. FIG. 17 shows an example of a display 91 performed by the display unit 84, with which the luminance of the icon image is differed between the icon images of the first devices 12a and the icon images of the second devices 12b. In the display 91 of FIG. 17, because MFP 2, which is a second device 12b, is displayed at a lower luminance than MFP 1 and Printer A, which are first devices 12a, the first devices 12a and the second device 12b can be displayed in a distinguishable manner.

Also, although in the exemplary embodiments described above, printers, scanners, and MFPs are employed as the devices 12, the devices 12 are not restricted thereto.

Also, as described above in the exemplary embodiments, each of the first management information and the second management information may be a single type of management information or may be a collection of a plurality of types of management information.

To achieve the above object, a first illustrative aspect of the present invention provides a device management system, which searches and manages a plurality of devices present on a network by each of the devices responding to a response request transmitted from a management apparatus coupled to the network and the management apparatus receiving the responses from the devices. Each of the devices is either a first device including a first storage unit which stores icon image data indicating the device and having specified information related to the device embedded therein as digital watermark information; a first response request receiving unit which receives the response request made by the management apparatus; and a first responding unit which transmits, when the first response request receiving unit receives the response request, first response information, including the icon image data stored in the first storage unit, to the management apparatus; or a second device including a second storage unit which stores icon image data indicating the device and not having specified information related to the device embedded therein as digital watermark information; a second response request receiving unit which receives the response request made by the management apparatus; and a second responding unit which transmits, when the second response request receiving unit receives the response request, second response information, including the icon image data stored in the second storage unit, to the management apparatus. Further, the management apparatus includes a response information receiving unit which receives the first response information and the second response information; a response detecting unit which detects whether the specified information is embedded as the digital watermark information in the icon image data respectively included in the first response information and the second response information received by the response information receiving unit; and a device specifying unit which specifies, in accordance with the response detecting unit, a device that is a transmission source of the first response information, having the specified information embedded therein, as the first device, and a device that is a transmission source of the second response information, not having the specified information embedded therein, as the second device.

Another illustrative aspect of the present invention provides a device coupled to a network, managed by a management apparatus coupled to the network, and including a storage unit which stores icon image data indicating the device and having specified information related to the device embedded therein as digital watermark information; a response request receiving unit which receives a response request made by the management apparatus; and a responding unit which transmits, when the response request receiving unit receives the response request, response information, including the icon image data, to the management apparatus.

Yet another illustrative aspect of the present invention provides a device management program, readable by a specific computer included in a management apparatus managing a first device and a second device by receiving first response information and second response information respectively from the first device. The first device includes a first storage unit which stores icon image data indicating the first device itself and having specified information related to the first device itself embedded therein as digital watermark information; and a first responding unit which transmits, in response to a request from the management apparatus, which manages the first device itself via a network, the first response information, including the icon image data stored in the first storage unit, to the specific computer. The second device includes a second storage unit which stores icon image data indicating the second device itself and not having the specified information embedded therein as digital watermark information; and a second responding unit which transmits, in response to a request from the management apparatus, the second response information, including the icon image data stored in the second storage unit, to the management apparatus. The device management program configuring the specific computer to include a response detecting unit which detects whether the specified information is embedded as the digital watermark information in the icon image data respectively included in the first response information and the second response information received, and a device specifying unit which specifies a device that is a transmission source of the first response information, having the specified information embedded therein, as the first device, and a device that is a transmission source of the second response information, not having the specified information embedded therein, as the second device.

In the device management system according to the first illustrative aspect, because each of the plurality of devices is either the first device or the second device, the icon image data indicating the device are stored by the first storage unit or the second storage unit. Moreover response request made by the management apparatus is received by the first response request receiving unit or the second response request receiving unit, and when the first response request receiving unit or the second response request receiving unit receives the response request, the first responding unit or the second responding unit transmits the first response information, including the icon image data stored in the first storage unit, or the second response information, including the icon image data stored in the second storage unit, to the management apparatus. Also, whereas the specified information related to the device is embedded as the digital watermark information in the icon image data stored in the first storage unit, the specified information related to the device is not embedded as the digital watermark information in the icon image data stored in the second storage unit. Also, because the first response information and the second response information are received by the response information receiving unit included in the management apparatus, the response detecting unit detects whether the specified information is embedded as the digital watermark information in the icon image data respectively included in the first response information and the second response information received by the response information receiving unit, and the device specifying unit specifies, in accordance with the response detecting unit, a device that is a transmission source of the first response information, in which the specified information is embedded, as the first device, and specifies a device that is a transmission source of the second response information, in which the specified information is not embedded, as the second device, the plurality of devices present on the network can be searched and managed by the management apparatus receiving the response information responded respectively by the devices in response to the response request transmitted from the management apparatus connected to the network.

With the device according to the another illustrative aspect, because the storage unit stores the icon image data indicating the device and having the specified information related to the device embedded as the digital watermark information, the response request receiving unit receives the response request made by the management apparatus, and the responding unit transmits the response information, including the icon image data, to the management apparatus when the response request receiving unit receives the response request, the icon image data, indicating the device and having the specified information related to the device embedded as the digital watermark information, can be returned as the response information in response to the response request transmitted from the management apparatus.

With the device management program according to the yet another illustrate aspect, because the response detecting unit detects whether the specified information is embedded as the digital watermark information in the icon image data respectively included in the first response information and the second response information received and the device specifying unit specifies, in accordance with the response detecting unit, a device that is a transmission source of the first response information, having the specified information embedded therein, as the first device, and a device that is a transmission source of the second response information, not having the specified information embedded therein, as the second device, the plurality of devices can be searched and managed based on the response information provided as responses by the respective devices.

Because the display unit may display on a display device, the icon image related to the icon image data included in the response signals, and the display controller may control the display on the display unit of the icon image, included in the first response information from a device specified as the first device by the device specifying unit, to be performed in the mode where the icon image, included in the second response information from a device specified as the second device by the device specifying unit, differs from the first device on the network, the display of the mode where the icon image of the first device and the icon image of the second device are displayed so as to differ visually or just the icon image of the first image is displayed is performed to enable recognition of the first device.

Also, because, in the management apparatus, the management information transmitting unit may transmit, to each of the devices, a first request signal, requesting transmission of first management information, indicating a first state of the device, to the management apparatus; a second request signal, requesting transmission of second management information, indicating a second state of the device, to the management apparatus; or a composite request signal, requesting transmission of the first management information and the second management information to the management apparatus, the management information transmission controller may control, in the transmission to the devices via the management information transmitting unit, the management information transmitting unit so as to transmit the first request signal and the second request signal respectively to the second device while controlling the management information transmitting unit to transmit the composite request signal to the first device, the management information receiving unit may receive the first management information and the second management information, transmitted from the devices in accordance with the receiving of the first request signal, the second request signal, or the composite request signal. The first device may include a composite request signal receiving unit which receives the composite request signal, and a composite management information transmitting unit which transmits, when the composite request signal receiving unit receives the composite request signal, the first management information and the second management information to the management apparatus. The second device may include a singular request signal receiving unit which receives one of either the first request signal or the second request signal, and a singular management information transmitting unit which transmits, when the singular request signal receiving unit receives one of either the first request signal or the second request signal, either the first management information or the second management information in correspondence to the received signal. Accordingly, the management apparatus can control transmission of the management information transmission request according to whether each device is the first device or the second device. Thus, for example, an occurrence of a circumstance such that, even though a request for acquiring a plurality of information items can be made in an efficient, bundled manner to a device specified as the first device, when the composite request signal is transmitted to a second device, which can only reply with the first management information, neither management information can be acquired and each individual transmission request must be made again, can be prevented. Generation of network traffic based on transmission requests for the first management information and the second management information can thus be suppressed.

Also, because, in regard to transmission and reception performed between the management apparatus and the devices, the transmission and reception of the response request and the response information are performed using a first communication protocol, and the transmission and reception of the first request signal, the second request signal, and the composite request signal, and the first management information, the second management information, and the composite management information are performed using a second communication protocol, contents of a request signal can be changed to the first request signal, the second request signal, or the composite request signal using the second communication protocol based on the response information acquired using the first protocol. Thus, a failure related to acquisition of the first management information and the second management information performed using the second protocol can be suppressed by classification of the plurality of devices using the first protocol. The generation of network traffic based on transmission requests for the first management information and the second management information can thus be suppressed.

Furthermore, advantageously in the device management system, the first protocol, used in the communication between the response request transmitting unit and the response request receiving unit of each device and the communication between the response information receiving unit and the responding unit of each device, is LLTD (link layer topology discovery), and the second protocol, used in the communication between the management information request transmitting unit and the composite request signal receiving unit or singular request signal receiving unit of each device and the communication between the management information receiving unit and the composite management information transmitting unit or the singular management information transmitting unit of each device, is SNMP (simple network management protocol). In this case, the response request transmitting unit can favorably transmit the response request using the LLTD that is a protocol with which transmission and reception of icon image data are defined, the response information receiving unit can receive the response using the LLTD, the management information request transmitting unit can transmit the state information request using the SNMP, which is a simpler protocol, and the management information receiving unit can receive the response using the SNMP.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A device management system comprising:
  a plurality of devices that are coupled to a network, the plurality of devices comprising a first device and a second device; and
  a management apparatus that is coupled to the network, wherein the first device comprises:
    a first storage unit that stores icon image data, the icon image data indicating the first device and comprising specified information related to the first device embedded therein as digital watermark information;
    a first request receiving unit that receives a request from the management apparatus;
    a first responding unit that transmits first response information to the management apparatus when the first request receiving unit receives the request, the first response information comprising the icon image data stored in the first storage unit;
    a composite request signal receiving unit that receives a composite request signal for requesting transmission of first management information indicating a first state of the first device and second management information indicating a second state of the first device;
    a composite management information transmitting unit that transmits the first management information and the second management information to the management apparatus when the composite request signal receiving unit receives the composite request signal,
  wherein the second device comprises:
    a second storage unit that stores icon image data, the icon image data indicating the second device but not comprising specified information related to the second device embedded therein as digital watermark information;
    a second request receiving unit that receives a request from the management apparatus;
    a second responding unit that transmits second response information to the management apparatus when the second request receiving unit receives the request, the second response information comprising the icon image data stored in the second storage unit;
    a singular request signal receiving unit that receives one of a first request signal for requesting transmission of the first management information and a second request signal for requesting transmission of the second management information; and
    a singular management information transmitting unit that transmits one of the first management information and the second management information to the management apparatus in correspondence with the one of the first request signal and the second request signal received by the singular request signal receiving unit when the singular request signal receiving unit receives the one of the first request signal and the second request signal,
  wherein the management apparatus comprises:
    a response information receiving unit that receives one or more of the first response information and the second response information;
    a response detecting unit that detects whether the specified information is embedded as the digital watermark information in the icon image data comprised by the first response information and the second response information;
    a device specifying unit that specifies a device that is a transmission source of the first response information comprising the specified information, as a first device, and a device that is a transmission source of the second response information not comprising the specified information, as the second device;
    a management information transmitting unit configured to transmit one or more of the first request signal, the second request signal, and the composite request signal to the specified device;
    a management information transmission controller that controls the management information transmitting unit to transmit one or more of the first request signal and the second request signal to the second device when the device specifying unit specifies that the specified device is the second device and that controls the management information transmitting unit to transmit the composite request signal to the first device when the device specifying unit specifies that the specified device is the first device; and a management information receiving unit that receives one or more of the first management information and the second management information transmitted from the specified device in response to the one or more of the first request signal, the second request signal, and the composite request signal.

2. The device management system according to claim 1, wherein the management apparatus further comprises:

a display unit that displays, on a display device, icon images related to the icon image data comprised by the first response information and the second response information; and a display controller that controls a display on the display unit such that an icon image associated with the first device is shown differently from an icon image associated with the second device.

3. The device management system according to claim 1, wherein the transmission and reception of the request and the response information are performed using a first communication protocol, and the transmission and reception of the first request signal, the second request signal, the composite request signal, the first management information and the second management information are performed using a second communication protocol.

4. A non-transitory computer readable medium storing a device management program, readable by a specific computer comprised by a management apparatus managing a plurality of devices that are coupled to a network with the management apparatus, the plurality of devices comprising a first device and a second device, wherein the first device comprises: a first storage unit that stores icon image data, the icon image data indicating the first device and comprising specified information related to the first device embedded therein as digital watermark information; a first request receiving unit that receives a request from the management apparatus; a first responding unit that transmits first response information to the management apparatus when the first request receiving unit receives the request, the first response information comprising the icon image data stored in the first storage unit; a composite request signal receiving unit that receives a composite request signal for requesting transmission of first management information indicating a first state of the first device and second management information indicating a second state of the first device; a composite management information transmitting unit that transmits the first management information and the second management information to the management apparatus when the composite request signal receiving unit receives the composite request signal, wherein the second device comprises: a second storage unit that stores icon image data, the icon image data indicating the second device but not comprising specified information related to the second device embedded therein as digital watermark information; a second request receiving unit that receives a request from the management apparatus; a second responding unit that transmits second response information to the management apparatus when the second request receiving unit receives the request, the second response information comprising the icon image data stored in the second storage unit;

a singular request signal receiving unit that receives one of a first request signal for requesting transmission of the first management information and a second request signal for requesting transmission of the second management information; and a singular management information transmitting unit that transmits one of the first management information and the second management information to the management apparatus in correspondence with the one of the first request signal and the second request signal received by the singular request signal receiving unit when the singular request signal receiving unit receives the one of the first request signal and the second request signal, the device management program configuring the specific computer to function as:

a response information receiving unit that receives one or more of the first response information and the second response information;

a response detecting unit that detects whether the specified information is embedded as the digital watermark information in the icon image data comprised by the first response information and the second response information;

a device specifying unit that specifies a device that is a transmission source of the first response information comprising the specified information, as the first device; and a device that is a transmission source of the second response information not comprising the specified information, as the second device;

a management information transmitting unit configured to transmit one or more of the first request signal, the second request signal, and the composite request signal to the specified device;

a management information transmission controller that controls the management information transmitting unit to transmit one or more of the first request signal and the second request signal to the second device when the device specifying unit specifies that the specified device is the second device and that controls the management information transmitting unit to transmit the composite request signal to the first device when the device specifying unit specifies that the specified device is the first device; and a management information receiving unit that receives one or more of the first management information and the second management information transmitted from the specified device in response to the one or more of the first request signal, the second request signal, and the composite request signal.

5. The non-transitory computer readable medium according to claim 4, wherein the management apparatus comprises:

a display unit that displays icon images related to the icon image data comprised by the first response information and the second response information, and the device management program configures the specific computer comprised by the management apparatus to function as a display controller that controls a display on the display unit such that an icon image associated with the first device is shown differently from an icon image associated with the second device.

* * * * *